United States Patent
Lee et al.

(10) Patent No.: US 6,671,325 B2
(45) Date of Patent: Dec. 30, 2003

(54) WIRELESS INFRARED DIGITAL AUDIO SYSTEM

(75) Inventors: Kah Yong Lee, Singapore (SG); Beng Huat Chua, Singapore (SG); Chee Oei Chan, Singapore (SG); Chee Kong Siew, Sigapore (SG)

(73) Assignee: Free Systems Pte. Ltd., Singapore (SG)

( * ) Notice: Subject to any disclaimer, the term of this patent is extended or adjusted under 35 U.S.C. 154(b) by 0 days.

(21) Appl. No.: 10/283,470

(22) Filed: Oct. 30, 2002

(65) Prior Publication Data

US 2003/0053548 A1 Mar. 20, 2003

Related U.S. Application Data

(63) Continuation of application No. 09/425,315, filed on Oct. 25, 1999, now Pat. No. 6,510,182.

(51) Int. Cl.[7] .............................................. H04L 27/00
(52) U.S. Cl. ...................................... 375/259; 375/260
(58) Field of Search ................................ 375/259, 239, 375/260, 261, 295, 298, 316, 326, 342, 346, 278, 285; 455/3.01, 66, 91, 102, 93, 103, 110, 118, 131; 381/77, 79, 80, 85, 2, 7, 13, 14

(56) References Cited

U.S. PATENT DOCUMENTS

| | | | | |
|---|---|---|---|---|
| 4,151,407 A | * | 4/1979 | McBride et al. | 359/158 |
| 4,829,570 A | * | 5/1989 | Schotz | 381/3 |
| 5,684,871 A | * | 11/1997 | Devon et al. | 375/239 |

(List continued on next page.)

FOREIGN PATENT DOCUMENTS

| JP | 08-018891 | 1/1996 | ............ | H04N/5/60 |
|---|---|---|---|---|

OTHER PUBLICATIONS

U.S. patent 5,596,648 to Fast, "Infrared Audio Transmitter System", describes a wireless infrared audio transmission system where infrared LED emitters are activated by a frequency modulated pulse wave tranmitted as light to a receiver.

U.S. patent 5,832,024 to Schotz et al., "Digital Wireless Speaker System", describes the use of forward error correction codes using the well known Reed–Solomon Coding.

U.S. patent 5,596,603 to Haupt et al., "Device for Wireless Transmission of Digital Data, in Particular of Audio Data, by Infrared Light in Headphones", describes a device for wireless transmission of audio signals.

(List continued on next page.)

Primary Examiner—Don N. Vo
Assistant Examiner—Khanh Cong Tran
(74) Attorney, Agent, or Firm—George O. Saile; Stephen B. Ackerman; Billy Knowles

(57) ABSTRACT

A system for transmitting, receiving, recovering, and reproducing digitized samples of analog signals while concealing unrecoverable digitized samples of analog signals to maintain a level of fidelity in reproducing the analog signals. The digitized samples of the analog signals are burst transmitted such that the probability of interference with the transmission and thus corruption of the digitized samples of the analog signals is minimized. The digitized samples are received without synchronizing a receiving clock with a transmitting clock to capture the digitized samples of the analog signals. The digitized samples are converted from various sampling rates to digitized samples of the analog signals having a rate. Any large groups of digitized samples that are in error or corrupted in transmission are softly muted to avoid annoying clicks. Any long term difference between a transmit clock and a receive clock is tracked and the digitized samples are interpolated or decimated to eliminate any underrun or overrun of the digitized samples.

46 Claims, 12 Drawing Sheets

U.S. PATENT DOCUMENTS

| | | | | |
|---|---|---|---|---|
| 5,745,582 | A | * | 4/1998 | Shimpuku et al. ............. 381/77 |
| 5,946,343 | A | * | 8/1999 | Schotz et al. ................ 375/141 |
| 6,219,380 | B1 | * | 4/2001 | Wang et al. ................. 375/239 |
| 6,357,029 | B1 | * | 3/2002 | Sinha et al. ................. 714/752 |

OTHER PUBLICATIONS

U.S. patent 5,602,669 to Chaki, "Digital Signal Transmission Apparatus, Digital Signal Transmission Method, and Digital Signal Transmitter–Receiver", describes a digital transmitter–receiver that transmits a digital audio signal within a specified frequency band, and receives the specified frequency band.

U.S. patent 5,420,640 to Munich et al., "Memory Efficient Method and Apparatus for Sync Detection", describes a memory efficient method and apparatus for synchronization detection within a digital data stream over a communication path.

U.S. patent 5,745,582 to Shimpuku et al., "Audio Signal Transmitting Apparatus Audio Signal Receiving Apparatus and Audio Signal Transmitting and Receiving System", teaches an audio signal transmitting and receiving system which can perform optical transmission of a digital format audio signal with small deterioration of the sound quality over the transmission path.

U.S. patent 5,889,820 to Adams, "SPDIF–AES/EBU DIgital Audio Data Recovery", describes a circuit for SPDIF–AES/EBU digital audio data recovery.

European Patent Application EP 1 143 716 A2 to Topper, "Apparatus and method for concealing interpolation artic-facts in a video interlaced to progressive scan converter," discusses a method for detecting and correcting errors in the interpolated portions of a progressive image.

European Patent Application EP 1 096 715 A2 to Lee et al., "Data recovery for wireless digital audio system," discusses electronic circuits and systems that transmit and receive digital audio signals.

European Patent Application EP 1 096 716 A2 to Lee et al., "Data recovery for a wireless digital audio receiving system," discusses electronic circuits and systems that transmit and receive digitally sampled analog signals.

European Patent Specification EP 0 642 129 B1 to Kathmann et al., "Transmission system with reconstruction of missing signal samples," discusses a transmission system for sequentially transmitting signal samples.

\* cited by examiner

WIRELESS INFRARED DIGITAL AUDIO SYSTEM

CROSS-REFERENCE TO RELATED APPLICATIONS

This application is a continuation of commonly-owned U.S. patent application Ser. No. 09/425,315 filed on Oct. 25, 1999, now U.S. Pat. No. 6,510,182, issued Jan. 21, 2003 and is incorporated herein by reference.

BACKGROUND OF THE INVENTION

RELATED PATENT APPLICATIONS

"A Wireless Infrared Digital Audio Transmitting System," Ser. No.: 09/425,314, Filing Date: Oct. 25, 1999, assigned to the Same Assignee as the present invention.

"A Wireless Infrared Digital Audio Receiving System," Ser. No.: 09/427,020, Filing Date: Oct. 25, 1999, assigned to the Same Assignee as the present invention.

1. Field of the Invention

This invention is generally related to electronic circuits and systems that transmit and receive digitally sampled analog signals. More particularly, this invention relates to electronic circuits and systems that transmit and receive digital audio signals.

2. Description of the Related Art

The transmission of analog signals between a source of the analog signals and a reproduction of the analog signals at an output transducer is well known in the art. U.S. Pat. No. 5,596,648 (Fast) describes a wireless infrared audio transmission system where infrared LED emitters are activated by a frequency modulated pulse wave transmitted as light to a receiver. The audio analog signal modulates the frequency modulated pulse wave.

U.S. Pat. No. 5,596,603 (Haupt, et al.) illustrates another device for wireless transmission of audio signals. Refer now to FIG. 1 for an overview of this structure. The analog source 5 provides a left channel L and a right channel R. The analog source 5 would be microphones, a FM tuner/receiver, or an analog recording media. The left channel L and the right channel R are inputs to analog-to-digital converters 15 and 20. It is well known in the art that the analog sources can provide any number of channels. The left channel L and right channel R are chosen for illustration purposes.

Additionally, the analog signals from the analog source 5 can have been previously converted to digitized samples and then provided by the digital source 10. The digitized samples of the analog signals are retained in a data buffer 25. The digitized samples are then formatted in data frames in the data formatting unit 30. In Haupt, et al. a data frame is 128 bits in length for each channel (left channel L or right channel R). The data frames are then transferred to the date modulator 35. A carrier signal is then modulated with the data frames.

In the case of Haupt, et al., the data frames are changed from a 4 bit audio data to a 5 bit transmission data, which is used to activate and deactivate an infrared light emitting diode. The modulated carrier signal is transferred to a transmitter and then conveyed to the communication medium 45. The infrared light is then radiated through the open atmosphere to a receiving light sensitive diode. In this case, the communication medium 45 is the open atmosphere.

It is well known that the transmitter 40 can produce radio frequency waves in addition to light. Further, the communication medium 45 can be either wire such as coaxial cable, twisted-pair cable or other forms of metallic (copper) interconnection. Additionally, the communication medium 45 may be a fiber optic cable.

The receiver 50 will recover the modulated carrier signal from the communication medium 45. Typically, a clocking or timing signal is included in the data frame and the modulated carrier signal. A clock extraction circuit 55 will develop the embedded clocking or timing signal and synchronize the receiving subsystem 100 with transmitting subsystem 95. Classically, the clock extraction circuit 55 incorporates a phase locked oscillator, which can malfunction if there are errors in the transmitted modulated carrier signal.

The recovered modulated carrier signal is transferred to the demodulator 60 to extract the data frames. The data frames are then reformatted in the receive data formatter 65 to recreate the digitized samples of the analog signals. The recreated digitized samples are then transferred to the digital-to-analog converters 70 and 75 to reproduce the analog signals 80 and 85. Alternately, the digitized samples of the analog data can be transferred 95 to external circuitry for further processing.

The wireless transmission as shown in FIG. 1 is subject to corruption of the digitized samples during transmission. For instance, noise from an electronically ballasted halogen lamp would completely breakdown recovery of the transmission of the modulated carrier signal.

A solution to the corruption of the modulated carrier signal is to provide a level of redundancy for the digitized samples. U.S. Pat. No. 5,832,024 (Schotz, et al.) shows the use of forward error correction codes using the well known Reed-Solomon Coding. This will eliminate errors of relatively short duration, but will not prevent disruption of the output analog signals 80 and 85 due to long term digitized sample corruption.

To eliminate longer corruption of the digitized samples Schotz, et al. employs a convolutional interleaving circuit to separate the digitized samples of the analog signal that would normally be transmitted together. This allows the greater probability that a longer term error can be to be corrected If the error correction coding and the convolutional interleaving of the digitized samples cannot insure corrected digitized samples of the analog signals, the analog signal will be reproduced (especially in audio signals) as annoying cracks and pops in a speaker. To eliminate the cracks and pops, Schotz, et al. suggests that the digitized samples can be brought to a null level or muted. However, if the muting is activated suddenly, it is distracting and is annoying to the listener in an audio application.

U.S. Pat. No. 5,602,669 (Chaki) provides a digital transmitter-receiver that transmits a digital audio signal within a specified frequency band, and receives the specified frequency band. Chaki modulates a fundamental frequency using Quadrature Phase Shift Keying (QPSK). The QPSK modulated signal is transferred to an infrared emitter for transmission.

U.S. Pat. No. 5,420,640 (Munich, et al.) describes a memory efficient method and apparatus for synchronization detection within a digital data stream over a communication path. The digital data is arranged as a sequence of frames, each frame including a plurality of lines of data. The beginning of each frame is indicated by a frame synchronization word. The beginning of each line is indicated by a horizontal synchronization byte. An encoder, before transmission, interleaves the data. The decoder contains circuitry for locating the horizontal and frame synchronization data and contains circuitry for deinterleaving the digital data. Both the synchronization locating circuitry and the deinterleaving circuitry require access to a memory, but not at the same time. Therefore, a single memory is used with the synchronization recovery circuitry and deinterleaving circuitry alternately addressing the memory. The digital data stream of Munich, et al. pertains to video, audio and other related services of subscriber based television systems.

U.S. Pat. No. 5,745,582 (Shimpuku, et al.) teaches an audio signal transmitting and receiving system which can perform optical transmission of a digital format audio signal with small deterioration of the sound quality over the transmission path. The audio signal transmitting system has circuits to add an error correction signal to a digital audio signal. The digital audio signal with the error correction signal is then encoded and interleaved to generate an audio transmission signal. Repeating a digital control signal, which is to be used for the reproduction of the digital audio transmission signal, generates a continuous signal. A multiplexer combines the audio transmission signal and the continuous signal to generate a multiplexed signal. A modulation circuit then modulates a carrier signal similar to that described above with the multiplexed signal by a predetermined digital modulation method to generate a modulated signal within a predetermined frequency band. The modulated signal is transmitted by an optical transmission signal. A differential type QPSK modulation method creates the modulated signal preferably. Shimpuku, et al. further describes an audio signal receiving circuit for reproducing a digital audio signal and a digital control signal from the optical transmission signal. The audio signal receiving circuit has an optical receiver to convert the optical transmission signal to an electric reception signal. The modulated signal is then reproduced to permit demodulation of the reception signal by a digital demodulation method corresponding to the predetermined digital modulation method to reproduce the multiplexed signal. A separating circuit separates the audio transmission signal and the continuous signal from the multiplexed signal. The audio transmission signal is then deinterleaved and error correction based on the added error correction signal is performed to reproduce the digital audio signal The digital source 10 is often a compact audio disk (CD), a Moving Picture Expert Group Audio Layer 3 (MP3) data file, a digital audio tape (DAT), a Digital Video Disk (DVD), or a digital satellite receiver (DSR). The format of the digitized samples from a digital source 10 commonly complies with the Sony/Phillips Digital Interface (S/PDIF). International standards that have developed from this standard are the Audio Engineering Society (AES) AES-3, the European Broadcasters Union (EBU) Tech. 3250-E, the Japanese Electronic Industries Alliance (EIAJ) CP-340, and the International Electronic Commission (IEC) IEC60958. While these standards are similar, they are not necessarily identical. However, the data format as shown in FIG. 3 is common for each standard. The allowed sampling frequencies or sampling rates of the audio analog signals to create the digitized samples are the 44.1 kHz for CD and MP3, 48 kHz for DAT and DVD, and 32 kHz for DSR.

Refer now to FIG. 2 to discuss the data format of the S/PDIF family of international standards. A frame consists of two subframes 200 and 205 containing the samples from an A channel or left channel and a B channel or right channel. Each subframe has a synchronizing preamble A SYNC and B SYNC. The synchronizing preamble identifies the contents of the subframe as being either a word containing a sample of the A channel at the beginning of a block 215, the A channel within a block, or the B channel.

The digitized audio samples for channel A and channel B can contain up to 24 bits representing the amplitude of a sample of the analog audio signal. Normally for CD applications, only the 16 bits A8 through A23 are employed to convey the digitized audio samples. The bits AV and BV are the validity indicating if the digitized audio sample is in error. The bits AU and BU are user defined bits which when collected from many samples indicate running time, track number, etc. The bits AC and BC are channel status bits defining such information as emphasis, sampling rate, and copy permit. The bits AP and BP are parity bits for error detection to verify reception of the data samples.

The digitized audio samples are encoded using a commonly known biphase mark or Manchester coding technique. The samples are transferred serially at a rate of 2.8 MHz for a sampling rate of 44.1 kHz, 2 MHz for a sampling rate of 32 kHz, and 3.1 MHz for a sampling rate of 48 kHz.

A block of the digitized audio samples consists of 192 frames concentrated together.

U.S. Pat. No. 5,889,820 (Adams) describes a circuit for SPDIF-AES/EBU digital audio data recovery. The circuit decodes an input signal. The circuit includes a measurement sub-circuit having an input to receive a timing clock signal that is asynchronous with clocking of the input signal. The asynchronous timing clock signal measures the duration of a plurality of pulses received on the input signal in relation to frequency of the timing clock signal. A decode circuit decodes the input signal into digital data. The invention of Adams permits use of all digital components for decoding digital audio data encoding using biphase-mark encoded data according to the S/PDIF or AES/EBU standards.

SUMMARY OF THE INVENTION

An object of this invention is to provide a system for transmitting, receiving, recovering, and reproducing digitized samples of analog signals.

Another object of this invention is to conceal unrecoverable digitized samples of analog signals to maintain a level of fidelity in reproducing the digitized samples of the analog signal.

Further, another object of this invention is to transmit the digitized samples of the analog signals such that the probability of interference with the transmission and thus corruption of the digitized samples of the analog signals is minimized by transmitting the digitized samples as bursts shorter period than the time of the analog signals represented by the transmitted digitized samples.

Still further, another object of this invention is to receive the digitized samples of analog signal without synchronizing a receiving clock with a transmitting clock to capture the digitized samples of the analog signals.

Even still further, another object of this invention is to convert the digitized samples of the analog signals from an external source that has various sampling rates to digitized samples of the analog signals having a rate.

Again, another object of this invention is to softly mute the digitized samples of the analog signals when large groups of the digitized samples can neither be recovered nor concealed.

Another object of this invention is to track the long term difference between a transmit clock and a receive clock and to interpolate and decimate any underrun or overrun of the digitized samples of the analog signals within a group of digitized samples of the analog signals.

To accomplish these and other objects, a digital communication system for transmitting and receiving digitized samples of analog signals is comprised of a transmission subsystem for transmitting the digitized samples a communication medium to convey the transmitted digitized samples having various sampling rates, and a receiving system to receive and reproduce the transmitted digitized samples. The transmission subsystem receives the digitized samples having a variable sampling rate from an external signal source and then converts the digitized samples having a variable sampling rate to digitized samples with a fixed rate. The digitized samples have error correction codes generated to allow correction of any errors in the fixed digitized samples that may occur during transmission of the digitized samples. The digitized samples are formatted into groups of interleaved digitized samples with appended error correction codes. A preamble timing signal and a start signal is then appended to the group of interleaved digitized samples to form a transmit frame. A carrier signal is then modulated with the transmit frame and the modulated carrier signal is then transmitted to the communication medium.

The receiving subsystem is connected to the communication medium to receive and recover the modulated carrier signal. The modulated carrier signal is then demodulated to recover the transmit frame and to extract the group of interleaved digitized samples and the error correction codes from the transmit frame. The group of interleaved digitized samples with the error correction codes are checked, and the group of interleaved digitized samples with errors are corrected. If any of the group of interleaved digitized samples are uncorrectable, an estimated sample value of those uncorrectable digitized samples is created by interpolating from adjacent interleaved digitized samples to conceal any effect of the uncorrectable digitized samples. Any of the digitized samples that are not concealable or unrecoverable or are invalid are soft muted. The digitized samples are then transferred to a digital-to-analog converter for restoration of the analog signal.

The transmission subsystem has a sampled data receiver to receive the digitized samples of the analog signals from the external source of the digitized samples of the analog signals. A variable sampling rate converter is connected to the sampled data receiver to convert the digitized samples of the analog signals that are sampled at the one rate of the various sampling rates to digitized samples of the analog signals sampled at a fixed rate. A plurality of the digitized samples of the analog signals is retained in a data buffer. A data buffer controller is connected to the variable sampling rate converter and the data buffer to control the placement and removal of the plurality of digitized samples of the analog signals within the data buffer. An error correction code generator is connected to the data buffer controller to receive multiple digitized samples of the analog signals through the data buffer controller from the data buffer. The error correction code generator generates an error correction word that appended to the multiple digitized samples of the analog signals, and then returns the multiple digitized samples of the analog signals with the appended error correction word through the data buffer controller to the data buffer. The error correction code generator creates a Reed-Solomon error correction code with a the error correction code word that has a data block size of 238 bytes and one control byte and 16 parity bytes. A frame formatter is connected to the data buffer controller to receive an interleaved group of the multiple digitized samples of the analog signals with the appended error correction codes and appends a preamble timing signal and a start signal before the interleaved group of the multiple digitized samples of the analog signals to form a transmit frame. A pulse position modulator is connected to the frame formatter to receive the transmit frame and modulate a carrier signal according to a pulse position modulation with the transmit frame. A burst transmitter is connected between the pulse position modulator and the communication medium to convey a modulated carrier signal to the communication medium. The modulated carrier signal is transmitted as a burst within a short time period to minimize probability of interference on the communication medium.

The communication medium may be either wireless or wired and the modulated carrier signal may be transmitted as light or as Radio Frequency energy. The wired communication media may be either fiberoptic cable, coaxial cable, or two wire twisted pair cable.

The receiving subsystem has a receiver connected to the communication medium to sense and amplify the modulated carrier signal and to recover the transmit frame. A demodulator is connected to the receiver to demodulate the modulated carrier signal and extract the groups of interleaved multiple digitized samples of the analog signals with the appended error correction code. The demodulator is connected to a received data buffer to retain the group of interleaved multiple digitized samples of the analog signals with the appended error correction code. A received data buffer controller is connected to the demodulator and the received data buffer to control transfer of the groups of interleaved multiple digitized samples of the analog signals with the appended error correction code from the demodulator to the received data buffer. An error check and correction circuit is connected to the received data buffer controller to receive one group of the multiple digitized samples of the analog signals with the appended error correction code. The error check and correction circuit checks and corrects any errors that occur in transmission in the one group of the multiple digitized samples of the analog signals and then replaces the corrected group of the multiple digitized samples of the analog signals to the received data buffer. Any non-correctable digitized samples of the multiple digitized samples of the analog signals are identified for concealing. A block recovery circuit is connected to the received data buffer controller to receive and interpolate the non-correctable digitized samples of the analog signals to conceal an effect of the non-correctable digitized samples analog signals. A soft muting circuit is connected to the received data buffer controller to access those groups of the multiple digitized samples that were not correctly received and declared invalid and those of the multiple digitized samples of the analog signals with non-recoverable and non-concealable errors. The soft muting circuit, further, accesses those of the multiple digitized samples of the analog signals that are correct and adjacent to those of the multiple digitized samples of the analog signals that are invalid or with non-correctable and non-concealable errors. The soft muting circuit then applies a smoothing function to the multiple digitized samples of the analog signals to bring those of the multiple digitized samples of the analog signals that are invalid or with the non-correctable and non-concealable error to a null value.

The receiving subsystem has a jitter tracking circuit to compare the block transmission timing signal with a clock signal of the receiver subsystem to determine overrun and underrun of the contents of the group of interleaved multiple digitized samples of the analog signals with the appended error correction code. The block transmission signal indicates a boundary of groups of interleaved multiple digitized samples of the analog signals with the appended error correction codes. The number of words within each group of interleaved multiple digitized samples of the analog signals with the appended error correction codes must contains the correct number of digitized samples of analog signals. An interpolation and decimation circuit is connected to the jitter tracking circuit and the received data buffer controller to generate or eliminate digitized samples of the analog signals if the jitter tracking circuit indicates overrun or underrun of the contents of the group of interleaved multiple digitized samples analog signals.

An interface circuit is connected to the received data buffer controller to translate the digitized samples of the analog signals to a format acceptable by subsequent circuitry.

The digitized samples having variable sampling rates are sampled at sampling rates of 32 kHz, 44.1 kHz, and 48 kHz.

The transmission subsystem may have at least one analog-to-digital converter connected between the external source and the data buffer controller to receive the analog signals and to generate the digitized samples analog signals. The sampling rate of the analog-to-digital converter is approximately 48 kHz. An alternate sampling rate for the analog-to-digital converter is 44.1 kHz.

The interleaved group of the multiple digitized samples is comprised of a plurality of least significant bytes of the even designated digitized samples of the group of multiple digitized samples, a plurality of most significant of the even designated digitized samples, a first command byte, a first plurality of error correction parity bytes, a plurality of least significant bytes of the odd designated digitized samples, a plurality of most significant bytes of the odd designated digitized samples, a second command byte, and a second plurality of error correction parity bytes.

The carrier signal is modulated with a pulse positioned modulation by positioning of a pulse of the carrier signal within a period of the carrier signal according to a binary value of a plurality of bits within the transmit frame. The plurality of bits of this invention is two bits.

The digitized samples are encoded in a non-return to zero (NRZ) format.

The burst transmitter includes an infrared light emitting diode and a diode switching circuit connected between the pulse position modulator and the infrared light emitting diode to activate and deactivate the infrared light emitting diode with the modulated carrier signal.

The receiver comprises a light sensitive diode that receives light radiated from the infrared light emitting diode.

The demodulator demodulates the modulated carrier signal by oversampling the modulated carrier signal to determine an evaluation point of the modulated carrier signal to recover the transmit frame.

DETAILED DESCRIPTION OF THE INVENTION

Figure 1:
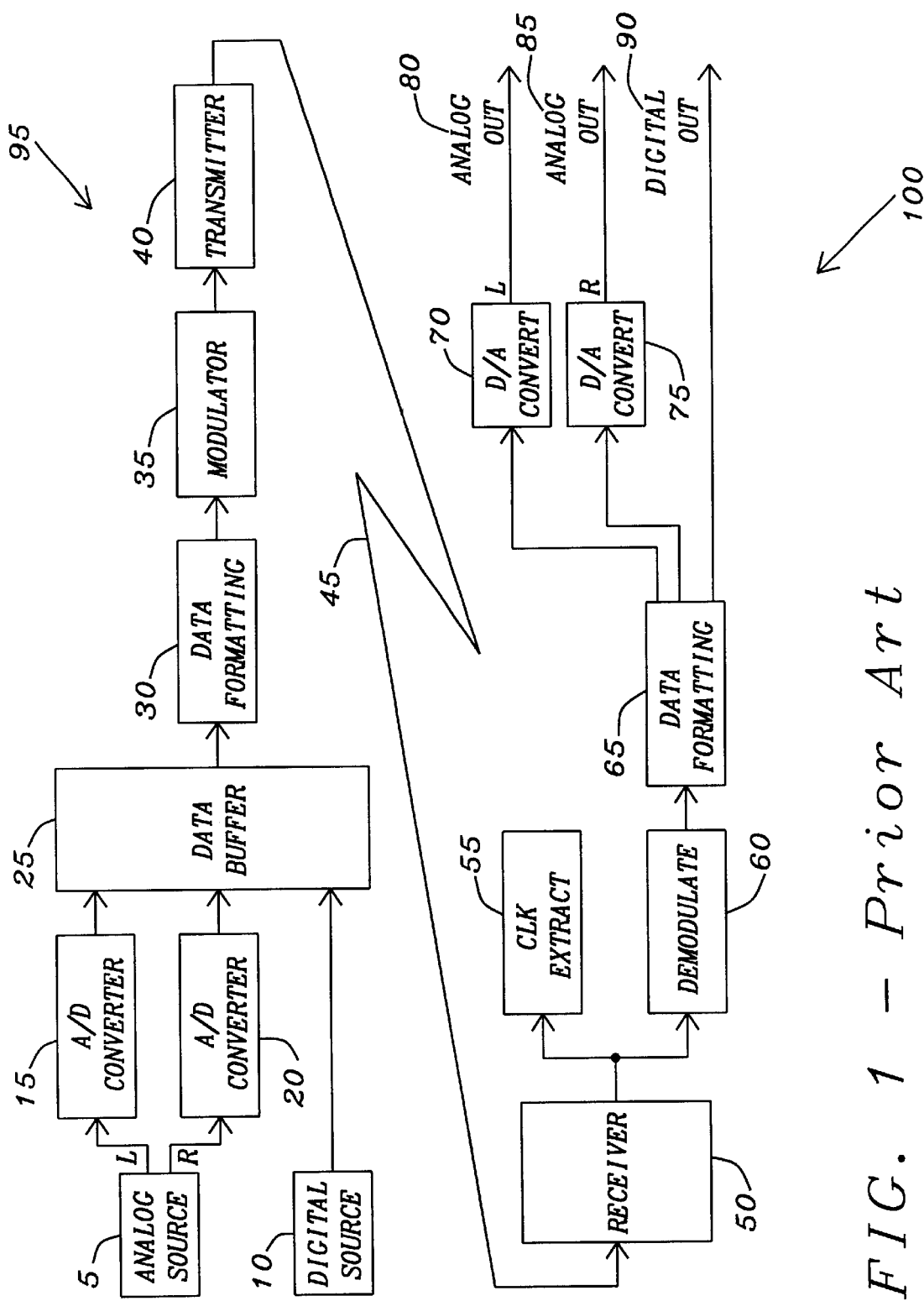
FIG. 1 is a block diagram of a transmitting and receiving system for digitized samples of analog signals of the prior art.
Figure 2:
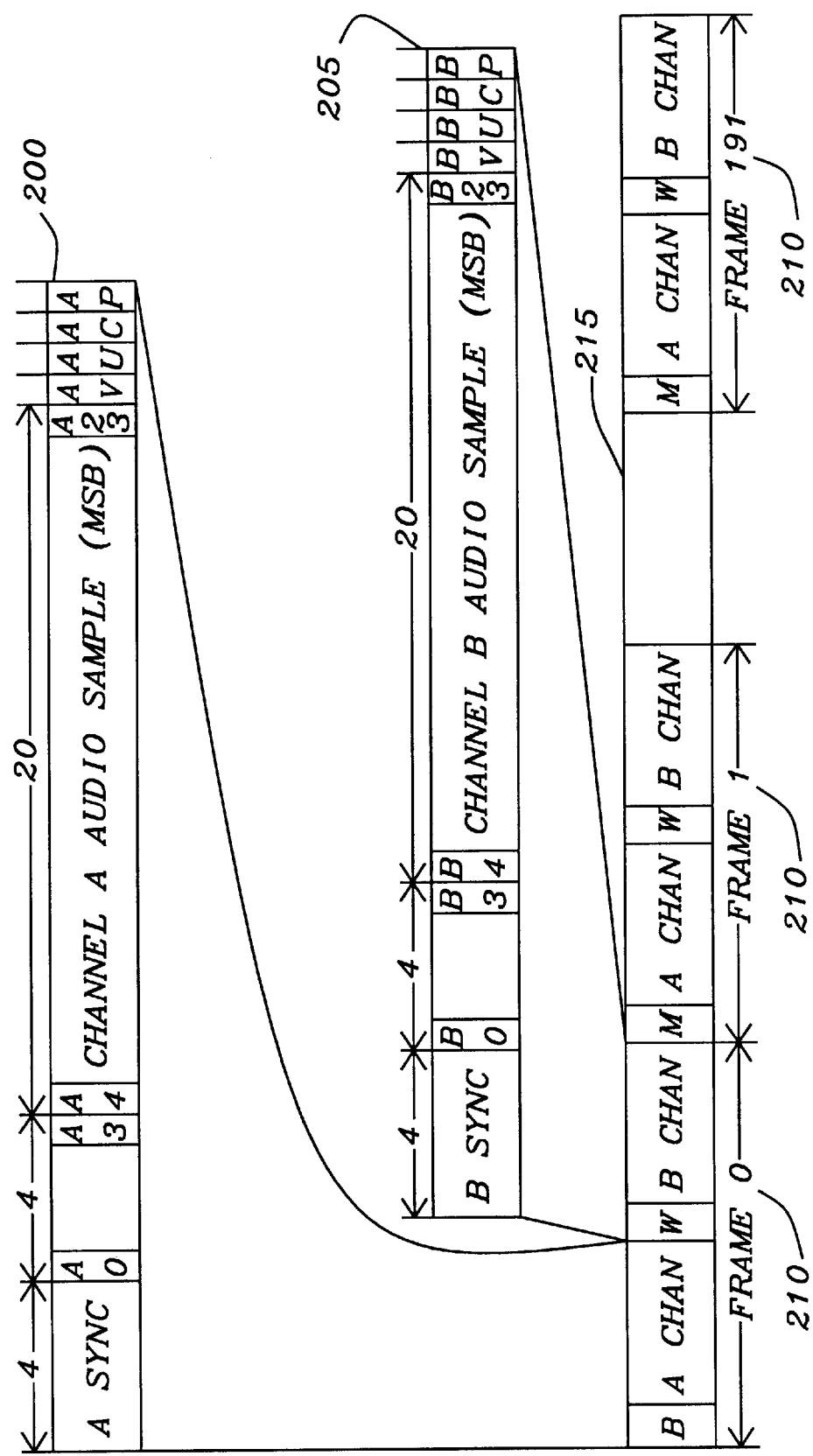
FIG. 2 is a diagram of the format of the S/PDIF interface.
Figure 3:
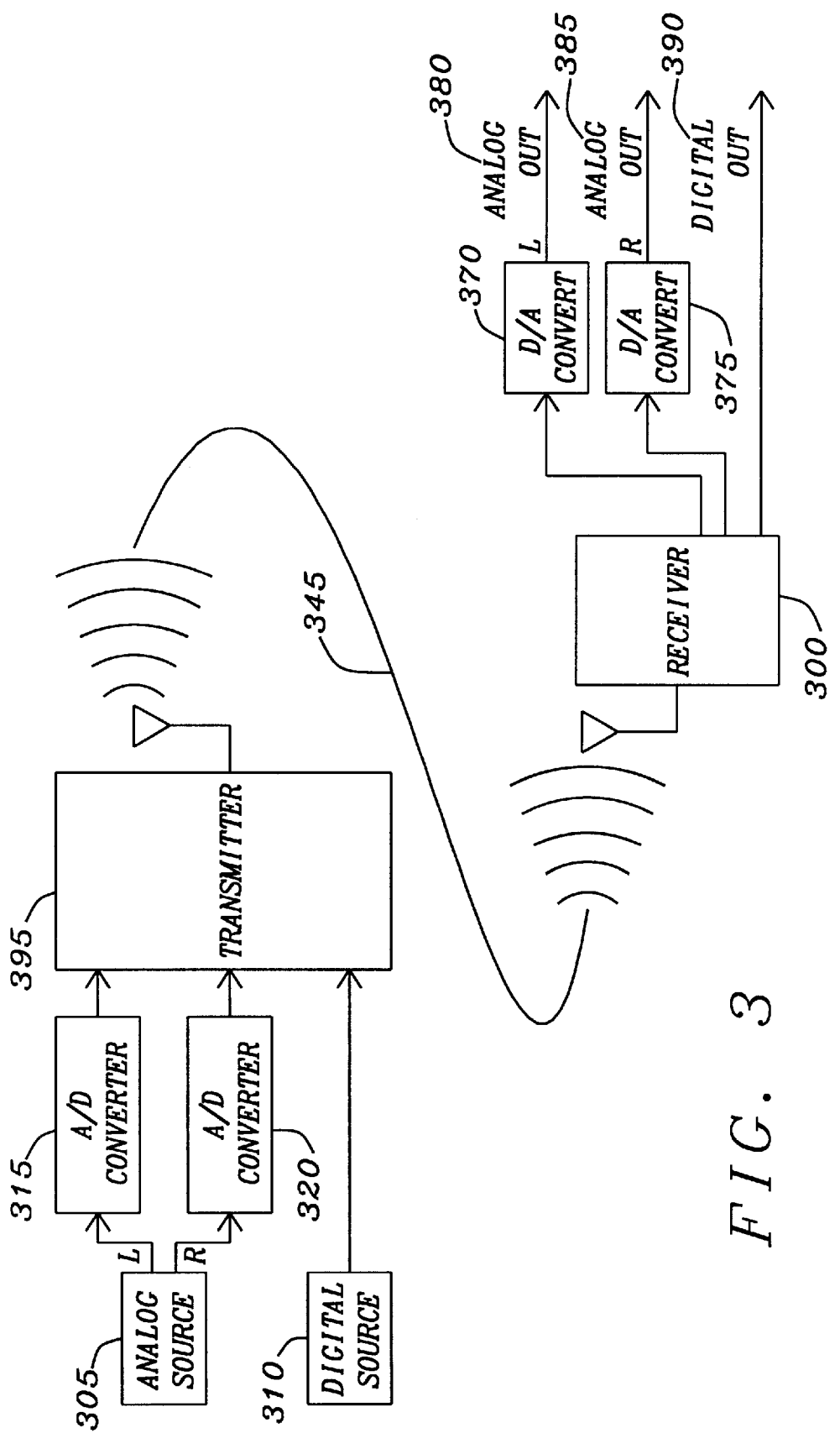
FIG. 3 is a block diagram of a transmitting and receiving system for digitized samples of analog signals of this invention.

Refer now to FIG. 3 for a discussion of the structure of the transmitting and receiving system of this invention. A source 305 of an analog signal generates analog signals to the left channel L and the right channel R. The analog source 305 may be microphones, a radio receiver/tuner, or analog recording media. The analog signals from the left channel L and the right channel R respectively are the inputs to the analog-to-digital converters 315 and 320. The analog-to-digital converters 315 and 320 sample the analog signals at a fixed rate. The fixed rate in the preferred embodiment is 48 kHz and in an alternate embodiment the fixed rate is 44.1 kHz.

The digital source 310 provides digitized samples of the analog signal that have been previously sampled and recorded or stored on a media such as a compact disk, digital audio tape, or other digital storage medium. The sampling rates of the digitized sample may differ from the fixed rate of the preferred embodiment. In the case of digital source 310, complying with the industry standards that implement the S/PDIF format, the sampling rates will be, as described above, 44.1 kHz, 48 kHz, and 32 kHz.

The digitized samples of analog signals are transferred to the transmitter 395. The transmitter 395 converts those digitized samples generated from differing sampling rates to digitized samples generated from the fixed rate.

The digitized samples are reorganized to interleave the digitized samples such that those digitized samples that are adjacent are separated such that they will be transmitted at different times. This separation minimizes the probability that any interference with the transmission prevents correction and reconstruction of the digitized samples.

Figure 8:
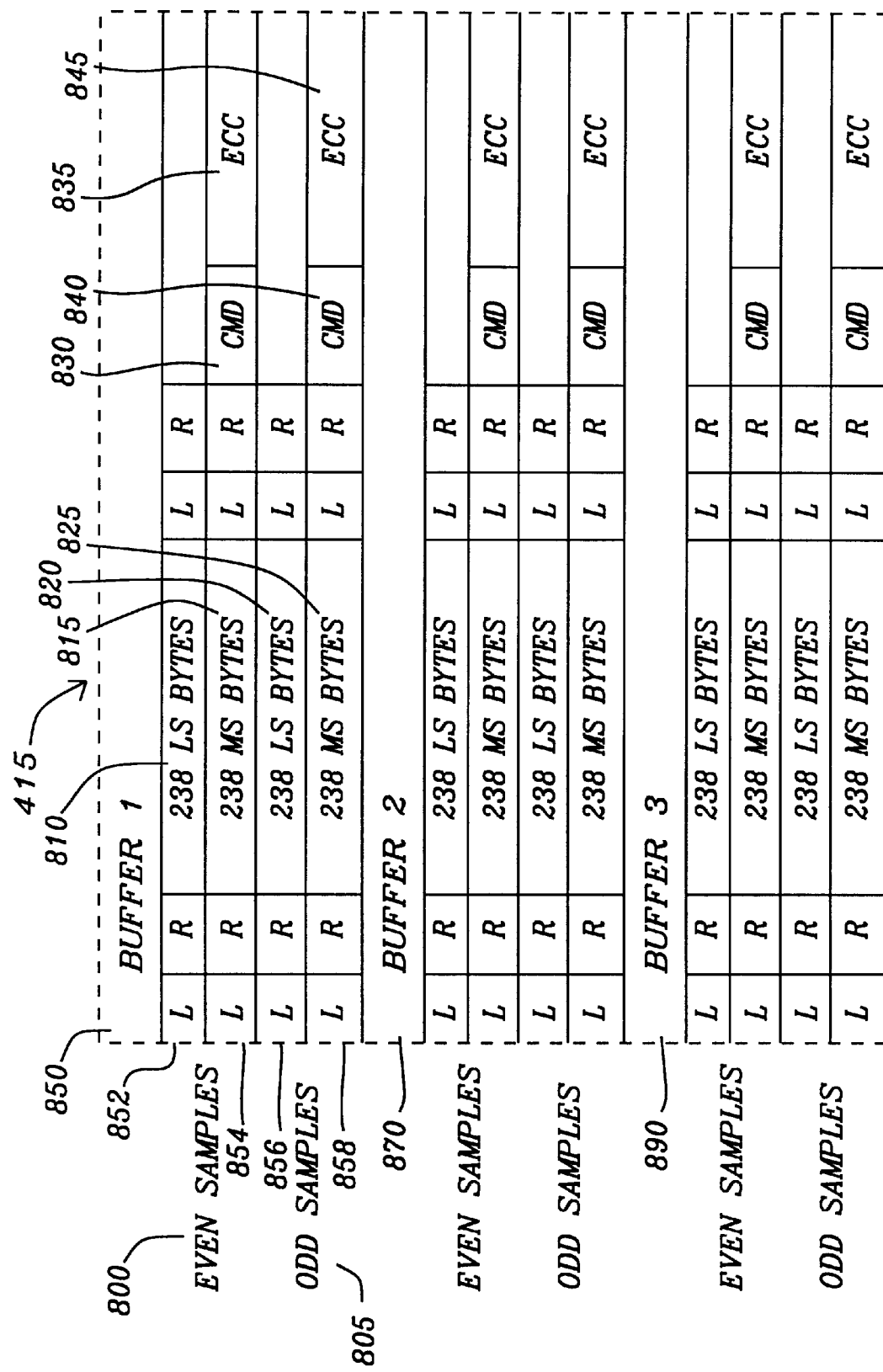
FIG. 8 is a diagram of the buffer addressing of the transmitter and receiver buffer of this invention.

Refer now to FIG. 8 for a discussion of the data structure of the digitized samples of this invention. In this invention, the data samples consist of two bytes (16 bits) of the possible data samples. The remaining byte (8 bits) of the S/PDIF format is discarded. The first group 810 of 238 bytes consists of the alternating least significant bytes of the left channel L (A channel) and the least significant bytes of the right channel R (B channel) of the even designated samples. The second group 815 of 238 bytes consists of the alternating most significant bytes of the left channel L and the most significant bytes of the right channel R of the even designated samples. The third group 820 of 238 bits consists of the alternating least significant bytes of the left channel L and the least significant bytes of the right channel R of the odd designated samples. The fourth group 825 consists of the alternating most significant bytes of the left channel L and the most significant bytes of the right channel R of the odd designated samples. As can be seen, the bytes of one digitized sample are separated by 238 bytes during a transmission. Further, two adjacent of the digitized samples are separated by at least 238 bytes. While this structure is adequate for the preferred embodiment, other interleaving patterns are possible and still are in keeping with the intent of this invention.

Returning to FIG. 3, the transmitter 395 generates error correction codes (ECC) 825 and 845 to be appended to the group of most significant bytes 810 and the group of most significant bytes 820 of the odd designated samples 805. The ECC codes 835 and 845 are forward error correction codes employing the Reed-Solomon method of error correction encoding. The ECC codes of this invention 835 and 845 have a symbol size of 8 bits or one byte and will have a Galois field $GF(2^m)$ or $GF(2^8)$. The block length (n) of the ECC codes 835 and 845 of this invention is 255 bytes $(2^8)$. The number of correctable errors is chosen to be 8 and therefore the message size is 239 bytes, which is 238 of the most significant bytes 815 and 825 of the even samples 800 and the odd samples 805 and one command and control byte 830 and 840.

The preferred embodiment allows correction of only the most significant bytes 815 and 820 of the digitized samples. It would be apparent to one skilled in the art that a different Galois field $GF(2^m)$ could be chosen and that a different number of correctable errors could further be chosen and still be in keeping with the intent of this invention.

Figure 6:
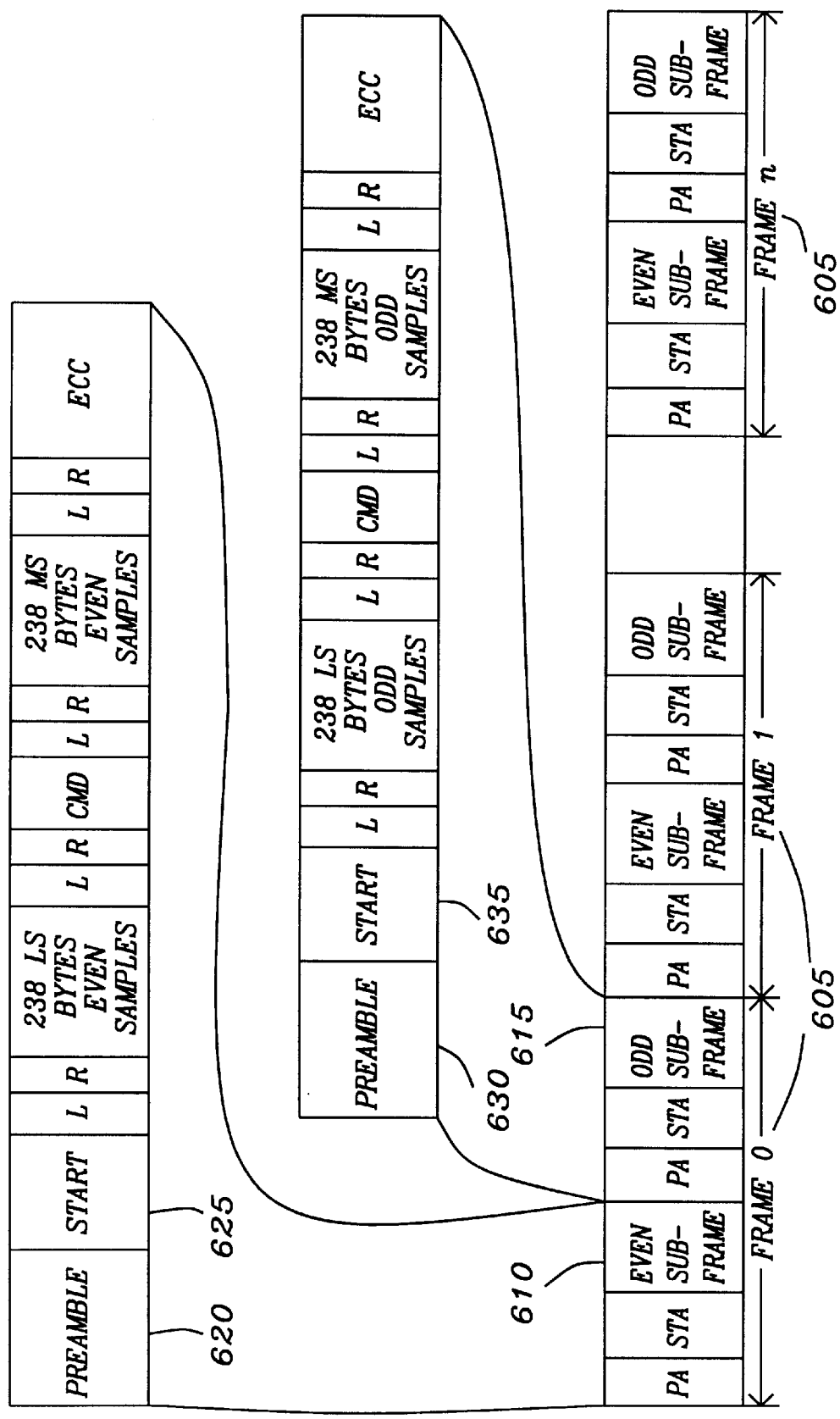
FIG. 6 is a diagram of the format of a block of frames of the digitized samples of analog signals to be transmitted and received by the transmitting and receiving system of this invention.

The interleaved digitized samples with the appended ECC code of FIG. 8 are formed for serial transmission as shown in FIG. 6. Each frame is divided into two subframes, an even subframe 610 and an odd subframe 615. The even subframe 610 is structured as described in FIG. 8 as the group of even designated digitized samples 800 and the odd subframe 615 is structure as described in FIG. 8 as the odd designated digitized samples 805. The ECC code 835 is appended to the even designated digitized samples to complete the subframe 610 and the ECC code 845 is appended to the odd designated digitized samples 805.

A timing preamble 620 and 630 and a start flag signal 625 and 635 are appended respectively before the even subframe 610 and the odd subframe 615. The timing preambles 620 and 630 each consist of up to 16 bytes of a unique pattern which identifies the beginning of each subframe 610 and 620. The timing preamble 620 and 630 pattern is a unique pattern that violates the normal pulse position modulation hereinafter described. The unique pattern of the timing preamble 620 and 630 is sufficiently long to allow the receiver to identify the timing preamble 620 and 630 and "lock" onto the timing preamble 620 and 630. The start flag signals 625 and 635 each consist of two bytes of a unique pattern indicating the beginning of the even subframes 610 and 615.

Figure 7:
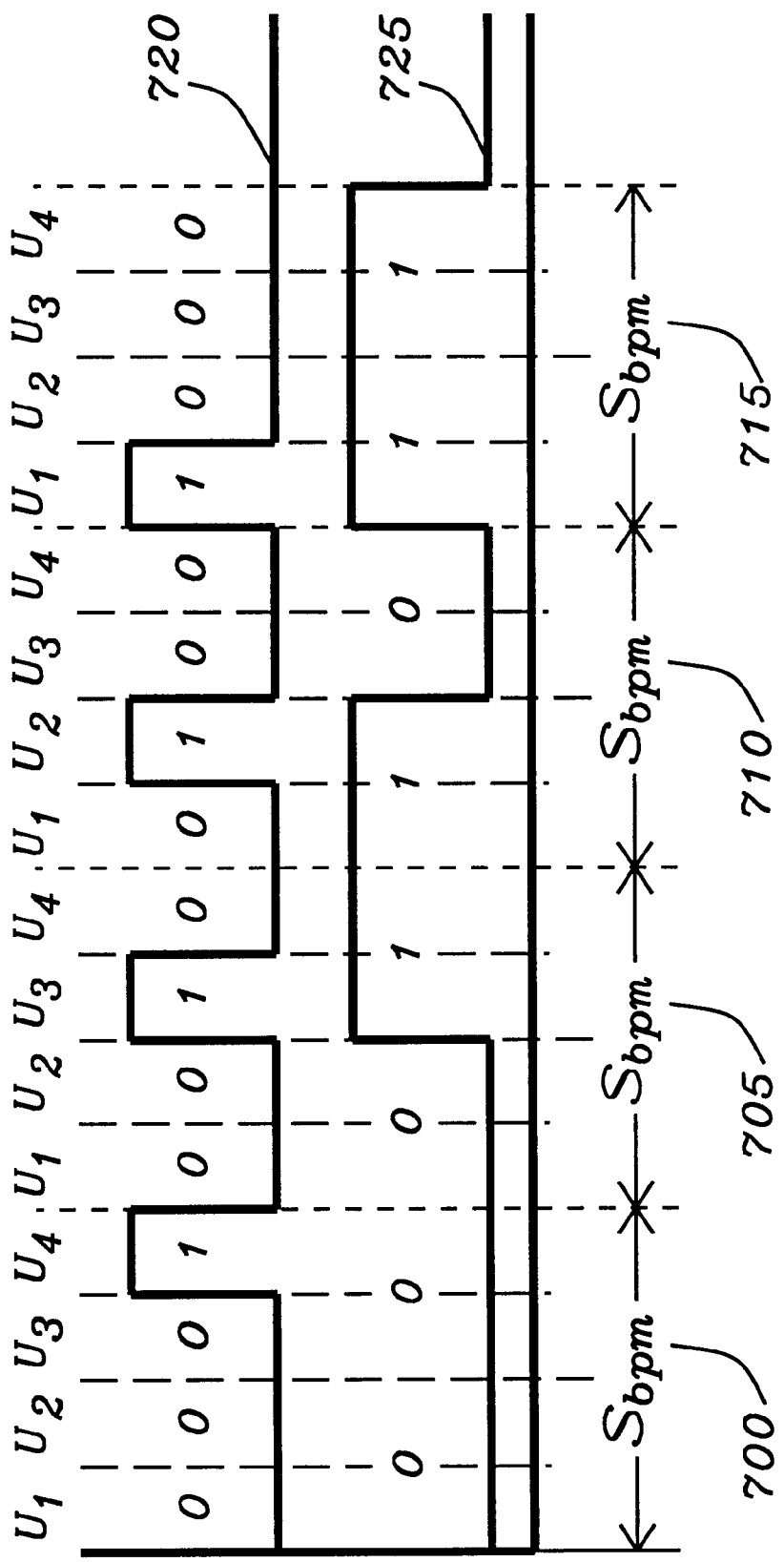
FIG. 7 is a diagram illustrating the conversion of the non-return to zero coding to the pulse position modulation of this invention.

The formatted groups of the digitized samples of the analog signals are then used to modulate a carrier signal within the transmitter. In the preferred embodiment, the modulation is a pulse position modulation (PPM) as shown in FIG. 7. The plot 725 shows the possible combinations of voltage levels that comprise a basic raw non-return to zero encoded data of the digitized samples. Each bit time $T_{bpm}$ 700, 705, 710, and 715 is divided into four phases $\phi_1$, $\phi_2$, $\phi_3$, $\phi_4$. The plot 720 shows the resulting pulse position modulation codes of this invention. The NRZ code (00) illustrated in the bit time 700 places a logic level 1 in the phase slot $\phi_1$; NRZ code (01) illustrated in the bit time 705 places a logic level 1 in the phase slot $\phi_2$, the NRZ code (10) illustrated in the bit time 710 places a logic level 1 in the phase slot $\phi_3$; and the NRZ code (11) illustrated in the bit time 715 places a logic level in the phase slot $\phi_4$.

The modulated carrier signal is then burst transmitted to a communication medium 345. The modulated carrier signal is transmitted as light or a radio frequency (RF) radiated into the atmosphere in wireless communication or is transmitted also as light or a radio frequency transferred to a transmission cable in wired communication. If the modulated carrier signal is transmitted as light, it is transmitted on a fiberoptic cable. If the modulated carrier signal is transmitted as RF, it is transmitted on a cable such as coaxial cable or simple twisted pair two wire cable.

The 476 digitized samples that compose a frame of the digitized samples represent 119 samples of a stereo music presentation or 2.479 milliseconds of the presentation. The transmission frequency of the modulated carrier signal in the preferred embodiment is at 2.0 MHz. Thus the transmission of 476 digitized samples coupled with the timing preamble, the start flag signal, the ECC code word, and the command and control byte (493) byte) requires 1.972 milliseconds to complete. The transmitter will not be transmitting or will be idle for 20.5% of the time. This will minimize the probability that any burst of noise will interfere with the transmission. If the transmission frequency is increased or the period of a burst of the digitized samples decreased, the time of transmission decreases and the idle time increases, further improving the probability of having no interference.

The modulated carrier signal that is transmitted on the communication medium 345 is conveyed to the receiver 300. The receiver will recover the modulated carrier signal by converting the light or RF signal to electrical signals. The modulated carrier signal is then demodulated to recover the transmitted frame of the groups of digitized samples of the analog signals.

The receiver of this invention does not extract a transmitted clock from the modulated carrier signal to synchronize the receiver 300 with the transmitter 395. The receiver 300 has a clock that is independent of the transmitter clock. The receiver clock is specified to be nominally identical with the transmitter clock, but because of tolerancing and phasing differences between the two clocks, the received modulated carrier signal is not always received correctly and causes errors.

To minimize the errors, the receiver recovers the modulated carrier signal to extract the transmit frame of the digitized samples of the analog signal by oversampling the modulated carrier signal. Oversampling is sensing the logic level at a rate that is a relatively large multiple of the frequency of the carrier signal. When a relatively large number of oversampling results indicate a series of samples having one logic level after an opposite logic level in the received modulated carrier signal, a starting evaluation point is arbitrarily assumed and each successive evaluation occurs at the frequency of the modulated carrier signal after the arbitrarily assumed evaluation point. The evaluated data is compared with the expected timing preamble. If a mismatch occurs between the evaluated data and the expected timing preamble, the starting evaluation point is adjusted and the data reevaluated. This process is repeated until the timing preamble is recovered from the received modulated carrier signal.

If the total timing preamble is then detected correctly, the timing of the recovering is determined to be locked. Once the receiving timing is locked to the received modulated carrier signal, the start flag signal is sought from the received modulated carrier signal. If the start flag signal is not found, the frame is declared invalid and brought to a null level. If the start flag signal is recovered from the received modulated carrier signal, the transmit frame is then recovered from the received modulated carrier signal.

Figure 11:
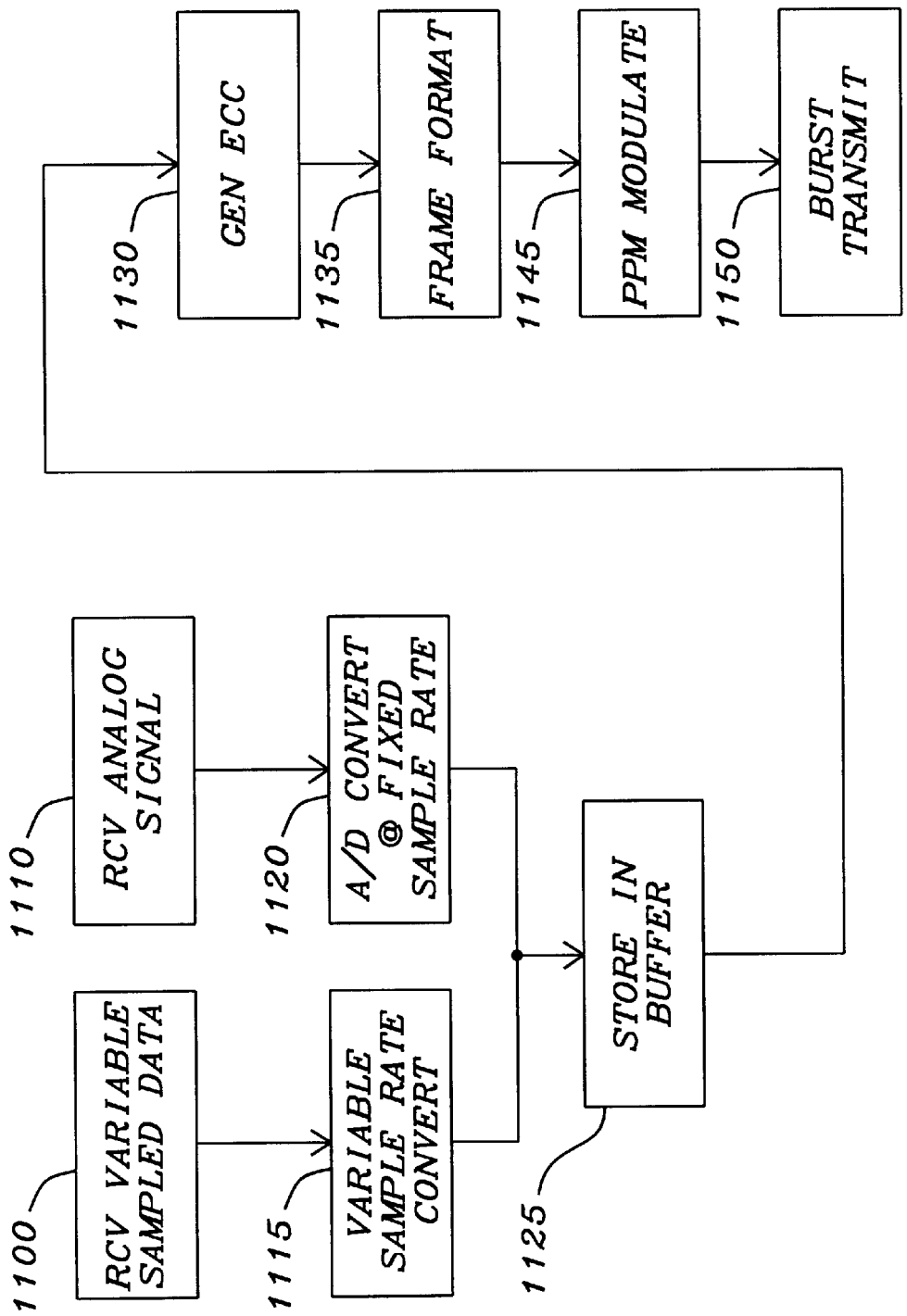
FIG. 11 is a flow diagram illustrating the method of transmitting digitized samples of analog signals of this invention.

Refer to FIG. 11 for a more complete overview of the selection of the evaluation point to determine the locking of the timing of the receiver 300 with the received modulated carrier signal 750. The recovery clock 755 has a frequency or rate of sampling that is, for the preferred embodiment, a factor of six times the frequency of the carrier signal 760. The timing clock 755 sets the sampling time of the modulated carrier signal 750. The recovered data 765 is the logic level of the modulated carrier signal 750 at the sampling time of the timing clock 755. As described above, the first logic level after an opposite logic level (logic level 0 in this case) starts the count to establish the arbitrary evaluation point 750. The successive evaluation points will be at the rate of the carrier signal 760 or in this case every sixth occurrence of the timing clock 755.

It is apparent to those skilled in the art that the frequency of the timing clock 755 can be modified to a multiple factor of the frequency of the carrier signal and still be in keeping with the intent of this invention.

The recovered transmit frame is then demodulated in the receiver 300 to extract the raw non-return encoded date of the digitized samples from the pulse position modulated code of the transmit frame.

The pulse position modulated code of the transmit frame is reconverted as explained in FIG. 7 to the raw non-return encoded data of the digitized samples to recover the transmit frame.

The interleaved digitized samples of the analog signals and the ECC codes are then checked, and any of the interleaved digitized samples that have been corrupted during transmission are corrected.

The ECC check and correction employs Reed-Solomon Error Correction methods that are well known in the art. In the preferred embodiment, 8 symbols or bytes are correctable in each of the group of 238 most significant bytes 810 and 820 of FIG. 8 plus one command and control byte. The method to accomplish the ECC checking and correcting begins with calculating the syndromes indicating any errors in the groups of most significant bytes 810 and 820. For those groups of most significant bytes 820 and 820 with error, Berlekamp's iterative algorithm is invoked to find the error locator polynomial. The Chien search method is then used to locate the roots of the error locator polynomial and the Forney algorithm is used to compute the error magnitudes to reconstruct the correct data. If there are more errors than are correctable by the Reed-Solomon Error Correction Method, in the case of the preferred embodiment 8 bytes, those non-correctable groups of the most significant bytes 810 and 820 are identified for further processing to conceal those errors.

The digitized samples of analog signals that are identified as having uncorrectable errors and their adjacent correct digitized samples are then combined to interpolate an estimate of the magnitude of the sample of the analog signal. It is well known that generally adjacent samples do not vary greatly in magnitude and that interpolating between adjacent samples will conceal any non-recoverable errors. In audio applications, the perception of the sound will not be affected, even though there may be some high frequency distortion.

If any frames of the digitized samples of the analog signals have uncorrectable and non-concealable errors, or if frames of the received modulated carrier signal are declared invalid, those frames are soft muted to prevent any "clicks" from unrecoverable errors. The soft muting employs a Hanning window to weight the frames of the digitized samples of analog signals adjacent to those frames that have uncorrectable errors and non-concealable errors or that are invalid to weight the amplitude of the adjacent frames to slowly decrease the amplitude of the analog signal to a null value.

Further, muting is achieved by programming a delay to null subsequent digitized samples of the analog signals. The extended nulling of the subsequent digitized samples of the analog signals avoid repetitive interference from such sources as infrared remote controls for television, video tape recorders, and audio systems. The infrared remote controls send a burst of data that can last from 0.2–1.0 seconds.

Each frame of the digitized samples of the analog signal must maintain a constant number of digitized samples. Even with the method of oversampling as described above, the differences between the clock of the transmitter 395 and the receiver 300 causes there to be an "overrun" (more digitized samples received in a frame) or "underrun" (fewer digitized samples received in a frame) of the digitized samples received in a transmit frame. An overrun causes more digitized samples to be in a transmit frame while an underrun causes fewer digitized samples to be received in a transmit frame. The receiver tracks the jitter or misalignment between the frequency of the carrier signal and the frequency of the transmit frame to detect any of the frames of the digitized samples having either an overrun or underrun. When an overrun or underrun occurs, the receiver 300 interpolates or decimates the frame of digitized samples to insure the constant number of digitized samples in a frame.

The frames of the digitized samples of the analog signals are transferred 390 to an external circuitry for further processing or are formatted to the appropriate order to be transferred to the digital-to-analog converters 370 and 375. Those digitized samples of the analog signal 370 of the left channel L are transferred to the digital-to-analog converter 370 that in turn reproduces the analog signal 380 for the left channel L. Those digitized samples of the right channel R are transferred to the digital-to-analog converter 375 that in turn reproduces the analog signal 385 for the right channel R.

Figure 4:
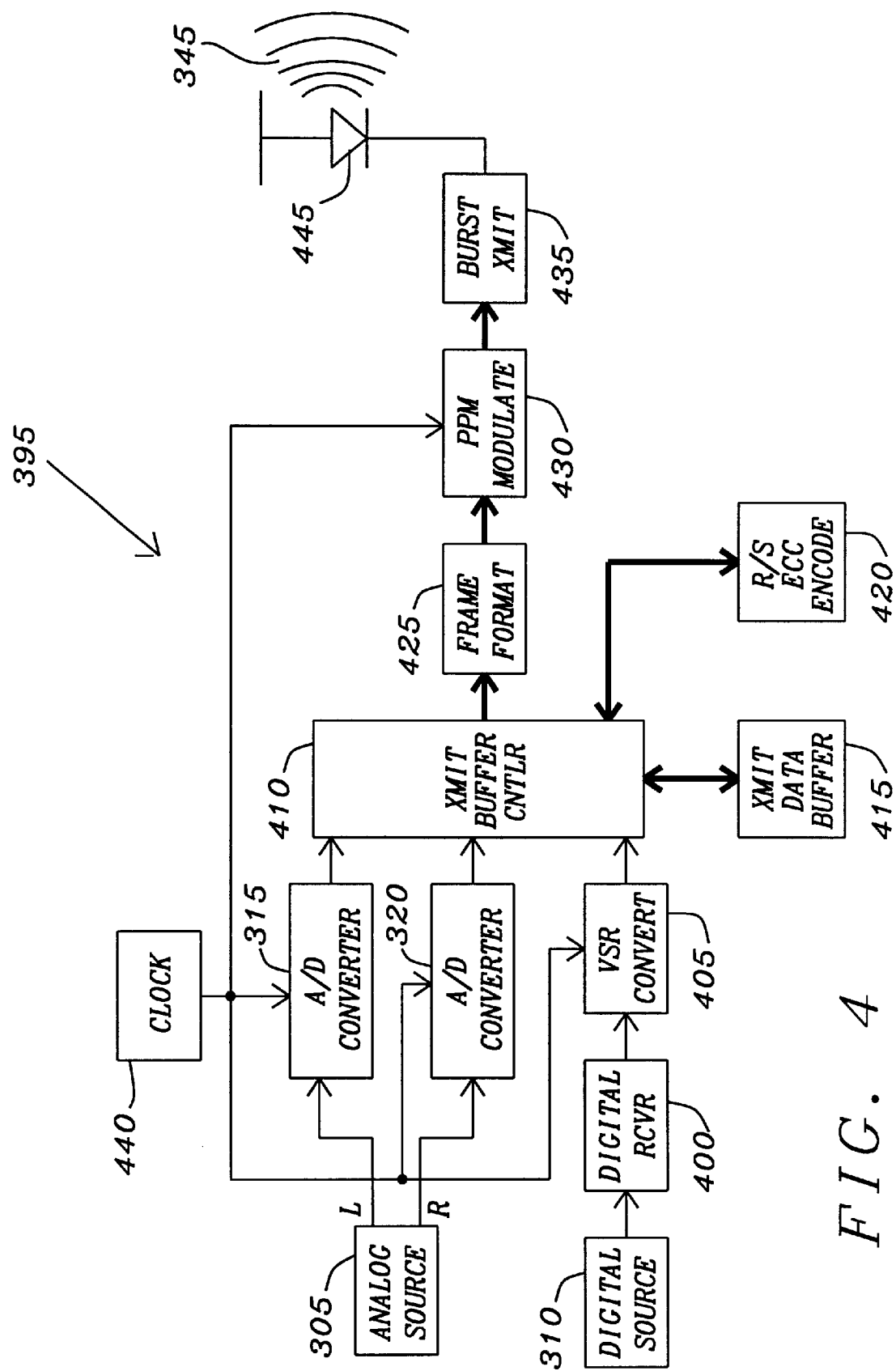
FIG. 4 is a block diagram of the transmitting system for digitized samples of analog signals of this invention.

Refer now to FIG. 4 for a discussion of the transmitter system 395 of this invention. The analog source 305, as described above, provides the left channel L and right channel R analog signals. The analog-to-digital converters 315 and 320 respectively sample the left channel L and right channel R analog signals and generate the digitized sample of the analog signals. Additionally, as described above, the digital source 310 provides digitized samples of the analog signal.

The digitized samples of the analog signals from the digital source 310 are transferred to the digital receiver 400. The digital receiver 400 acquires the digitized samples at the sampling rate at which they are retained within the digital source (e.g. 44.1 kHz for CD and MP3, 48 kHz for DAT and DVD, and 32 kHz for DSR). The digitized samples of the analog signals are transferred to the variable sampling rate (VSR) converter 405. The VSR converter 405 modifies the digitized samples of the analog signals to digitized samples of the analog signals sampled at a fixed rate. In the preferred embodiment, the fixed rate is 48 kHz. Thus, the digitized samples for CD are modified from a sampling rate of 44.1 kHz to that of 48 kHz. An alternate embodiment employs a fixed rate of 44.1 kHz.

A method to accomplish this is to send the digitized samples of the analog signals to a digital-to-analog converter to reproduce the original analog signal. The reproduced analog signal is then an input to an analog-to-digital converter that samples the reproduced analog signal at the fixed rate or 48 kHz for the preferred embodiment. In the alternate embodiment, the fixed rate may be another frequency such as 44.1 kHz.

The digitized samples of the analog signal are then transferred from the analog-to-digital converters 315 and 320 or the variable sampling rate converter through the transmit data buffer controller 410 to the transmit data buffer 415.

The transmit data buffer controller 410 controls the access to and the retrieving from the transmit data buffer 415 of the digitized samples of the analog signals. The transmit data buffer 415 is a random access memory (RAM). In the preferred embodiment, the transmit data buffer 415 is a static RAM. However, other memory structures such as dynamic RAM (DRAM) or synchronous DRAM can be used for the transmit data buffer 415 and still be in keeping with the intent of this invention Refer now to FIG. 8 to discuss the structure of the transmit data buffer 415 and the assignments of the component bytes of the digitized samples of the analog signals. The transmit data buffer 415 is segmented into groups of buffer blocks. In the preferred embodiment, there are three buffer blocks, buffer 1 850, buffer 2 870, and buffer 3 890. The digitized samples of the analog signals placed in each buffer, as described above, with 238 least significant bytes of the even designated digitized samples 810 of the analog signals occupy the first address segment 852 of the first buffer block 850. The 238 most significant bytes of the even designated digitized samples 815, the command and control byte 830, and the ECC code 840 occupy the second address segment 854 of the first buffer block 850. The 238 least significant bytes of the odd designated digitized samples 820 occupy the third address segment 856 of the first buffer block 850. The most significant bytes of the odd designated digitized samples 825 occupy the fourth address segment 858 of the first buffer block 850. This structure enables the interleaving of the digitized samples to allow the correction and concealment of errors during transmission.

Additional frames of the digitized samples are likewise retained in the buffer block 2 870 and buffer block 3 890 in the same organization as described for buffer block 1 850. This allows operations (receiving from the external sources 305 and 310, ECC encoding, and transmitting) to be accomplished in parallel.

Each of the groups of most significant bytes 815 and 820 and the command and control bytes 830 and 840 are read from the transmit data buffer 415 transferred through the transmit data buffer controller to the Reed-Solomon Error Correction Encoder 420. The ECC encoder 415 generates the symbol code work with a Galois Field GF ($2^8$). Each symbol is a byte, as above described, and the code allows 8 bytes to be corrected.

The ECC codes 840 and 845 are each appended respectively to the most significant bytes 815 and 825 of the even and the odd designated digitized samples 800 and 805 in the second address segment 854 and the fourth address segment 858.

The interleaved digitized samples are retrieved from each buffer block 850, 870, and 890 of the transmit data buffer 415 individually transferred to through the transmit data buffer controller 410 to the frame formatter 425. The frame formatter appends the timing preambles 620 and 630 and the start flag signals 625 and 635 of FIG. 6 to assemble the subframes of each transmit frame 605 of the interleaved group of digitized samples of the analog signals.

Figure 9:
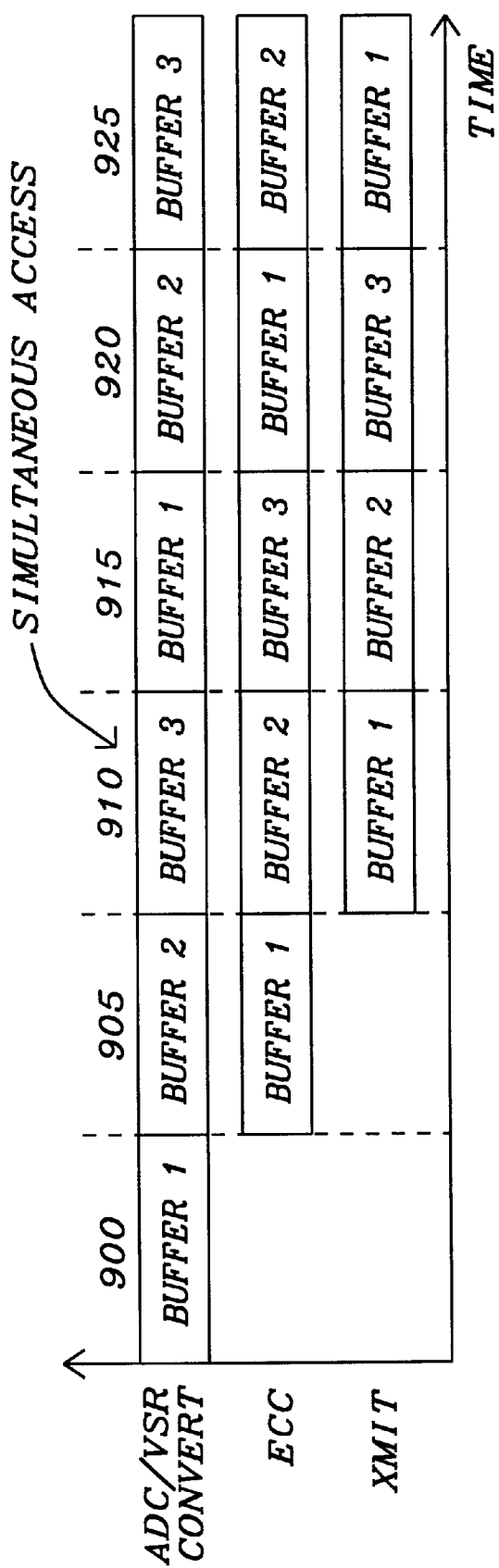
FIG. 9 is a timing diagram of the operation of the transmitter buffer of this invention.
Figure 10:
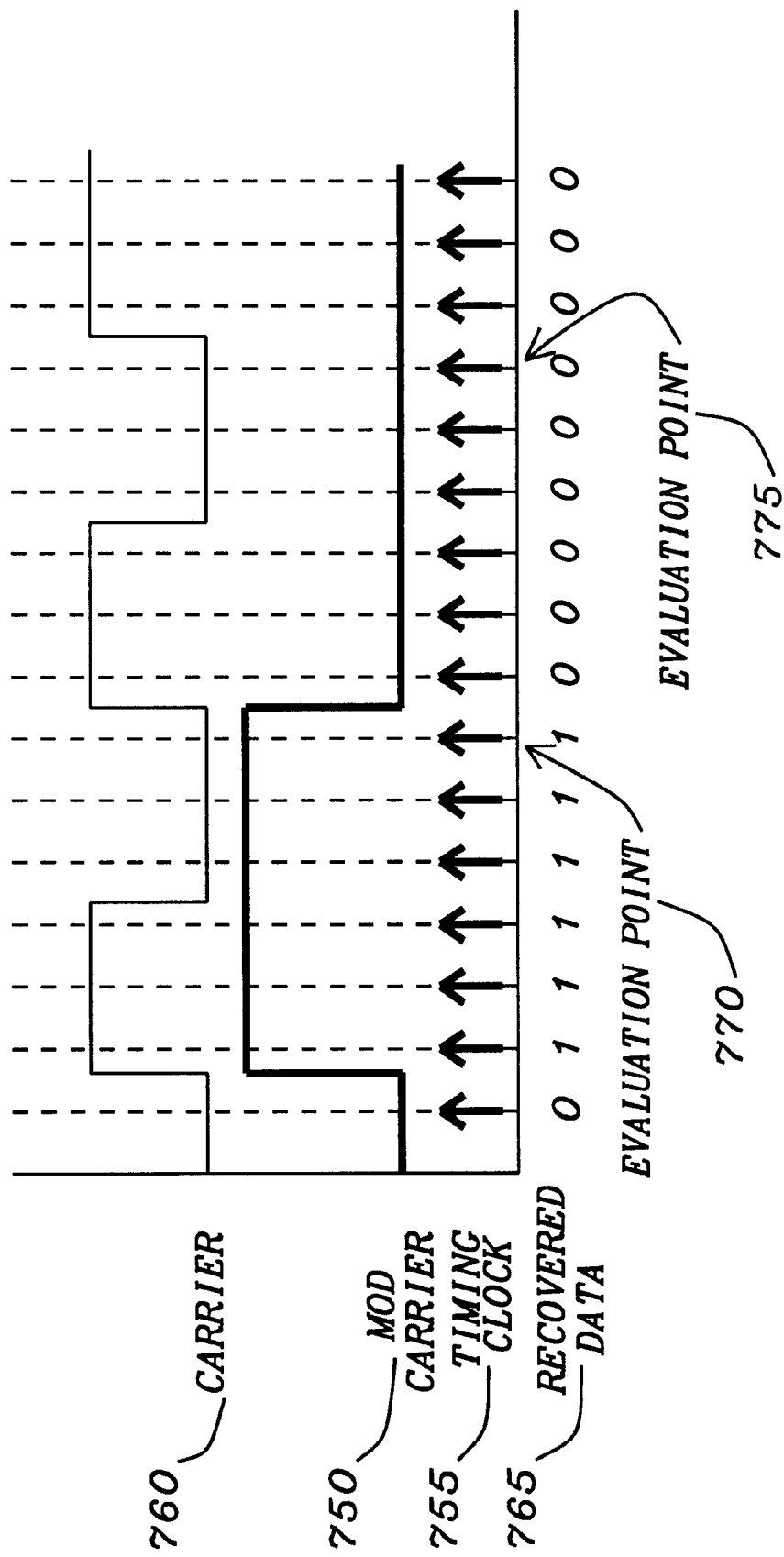
FIG. 10 is a timing diagram illustrating the over-sampling recovery of the received digitized samples of analog signals of this invention.

FIG. 9 shows the access and retrieval pattern of the transmit data buffer 415 of FIG. 4 over time. The first group of digitized samples from the analog-to-digital converter 305 or the digital source 310 are stored in the first buffer block 850 at the first time segment 900. The second group of digitized samples from the analog-to-digital converter 305 or the digital source 310 are stored in the second buffer block 870 during the second time segment 905. During the second time segment 905, the ECC encoder 420 accesses the first buffer block 850, generates the ECC codes 840 and 845, and stores the ECC codes 840 and 845 in the first buffer block 850. In the third time segment 910, a third group of digitized samples is stored in the third buffer block 890, the ECC codes are generated and stored in the second buffer block 870, and the first group of digitized samples with the appended ECC codes are transferred to the frame formatter 425 and on for transmission. During the fourth time segment 915, a fourth group of digitized samples are placed in the first buffer block 850, the group of digitized samples in the second buffer block 870 are sent on for transmission, and the ECC codes for the group of digitized samples in the third buffer block 890 are generated and stored back to the third buffer block 890.

This pattern or storing and accessing the transmit data buffer 415 continues for all following segments 920, 925 and forces simultaneous access and storing to the buffer blocks 850, 870 and 890. The transmit data buffer controller 410 must appropriately arbitrate the accesses and storing to ensure there are no conflicts.

From the frame formatter 425, the formatted transmit frame is transferred to the pulse position modulator 430. The pulse position modulator 430 encodes each pair of bits of the transmit frame as described above in FIG. 7. In the preferred embodiment, the frequency of the carrier signal modulated by the transmit frame is at least 2.0 MHz.

As described above, the period of time of the audio analog signal represented by the transmit frame is 2.479 milliseconds and with the carrier signal being 2 MHz, each transmit frame has a duration of 1.972 milliseconds. As described above, the burst transmitter 435 is activated to transmit the modulated carrier signal. In the preferred embodiment of this invention, the burst transmitter 435 is a switching circuit that activates and deactivates a light emitting diode 445 to send light to the atmosphere which acts as the communication medium 345.

As stated above, the communication medium 345 may be wired or wireless. The wired communication medium may be fiber optic cable, coaxial cable, or a two wire twisted pair cable. The burst transmitter 435 may transmit either light or RF signals into the wired or wireless communication medium 345.

The clock circuit 440 provides the necessary timing signals to the analog-to-digital converters 315 and 320 to ensure the fixed rate of 48 kHz (or the alternate fixed rate of 44.1 kHz). The clock circuit 440 provides the necessary timing signals to convert those digitized samples of the analog signal taken at rates other than the fixed rate to be converted to the digitized samples of the analog signal sampled at the fixed rate.

The clock circuit 440 generates the 2 MHz carrier signal and transfers it to the pulse position modulator 340 to create the modulated carrier signal that is the input to the burst transmitter 435.

The clock circuit 440 is fixed frequency timing generation circuit that eliminates the need for a phase locked loop oscillator at either the transmitter 395 or the receiver 300 of FIG. 4.

Figure 5:
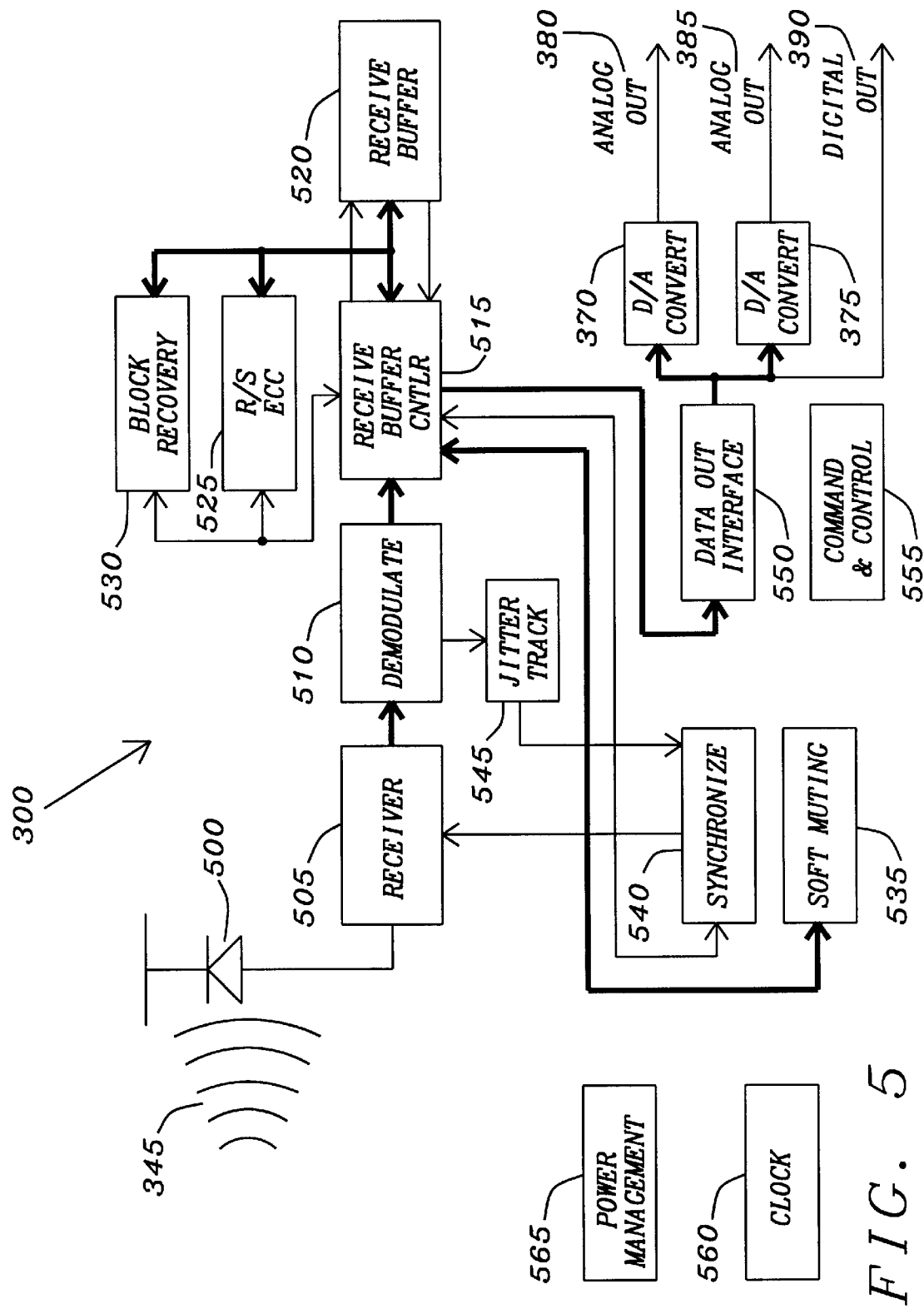
FIG. 5 is a block diagram of the receiving system for digitized samples of analog signals of this invention.

Refer now to FIG. 5 for a description of the receiving system 300 of this invention. The modulated carrier signal is transferred onto the communication medium 345 to a receiver 505 that recovers the modulated carrier signal. In the preferred embodiment, the light transferred through the atmosphere impacts upon a light sensitive diode 500. Changes in the light sensitive diode 500 are sensed and amplified in the receiver 505 to recover the modulated carrier signal. The receiver 505 locks on to the modulated carrier signal and completes the recovery by the oversampling of the modulated carrier signal to capture the groups of the digitized samples of the analog signals as above-described in FIG. 11. The demodulator 510 converts the pulse position modulated digitized samples to the raw non-return to zero encoded data of the digitized samples as above-described in FIG. 7.

The demodulated digitized samples now have the frame format of the interleaved digitized samples of FIG. 8 and are transferred from the demodulator 510 through the receive data buffer controller 515 to the receive data buffer 520.

The receive data buffer 520 is structured as the transmit data buffer 415 of FIG. 4. The receive data buffer 520 is a random access memory, which, in the preferred embodiment of this invention, is a static RAM. However, other memory structures such as DRAM or synchronous DRAM can be used as the receive data buffer 520 and still be in keeping with the intent of this invention.

The structure of the receive data buffer 520 is identical to that of the transmit data buffer 415 as described in FIG. 8. The receive data buffer 520 has the groups of buffer blocks 850, 870, and 890. Each of the buffer blocks 850, 870, or 890 has address segments 852, 854, 856, and 858 to retain the frame of the interleaved digitized samples of the analog signal.

The most significant bytes of the even designated samples of the analog signal 815 and the most significant bytes of the odd designated samples of the analog signal 825 with the respective appended ECC codes 840 and 845 are retrieved by the receive data buffer controller 515 from the receive data buffer 520 and transferred to the Reed-Solomon EEC decoder 525. The Reed-Solomon EEC decoder 525 checks and corrects the most significant bytes of the even and odd designated digitized samples 815 and 825 using the Reed-Solomon ECC method as described above. The corrected most significant bytes of the even and odd designated digitized samples 815 and 825 are stored through the receive data buffer controller 515 to the receive data buffer 520. Those of the even and odd most significant bytes of the digitized samples having uncorrectable errors (more than 8 bytes in error as described above) are identified for further processing to conceal the effect of the errors on the reproduced analog signal.

Those of the digitized samples identified as having uncorrectable errors are retrieved with their adjacent correct digitized samples of the analog signals from the receive data buffer 520 and transferred through the receive data buffer controller 515 to the block recovery circuit 530. The block recovery circuit 530 interpolates an estimate of the uncorrectable digitized sample from the adjacent digitized samples of the analog signal to conceal the uncorrectable error in the digitized sample. The preferred embodiment employees a linear interpolation between adjacent digitized samples to insure an ease of hardware implementation. It is in keeping with the invention to use more complex interpolation methods.

The interpolated estimate of a correct magnitude of the uncorrectable digitized sample is transferred from the block recovery circuit 530 through the receive data buffer controller 515 to be stored in the location of the uncorrectable digitized samples with the receive data buffer 520.

Any of the digitized samples that have errors that are neither correctable nor concealable are identified for soft muting.

Those buffer blocks segments containing invalid frames or uncorrectable and non-concealable digitized samples are transferred to the soft muting circuit 535 with a number of adjacent frames of the digitized samples of the analog signal. The soft muting circuit 535 applies a Hanning window to the frames of the digitized samples to weight the frames adjacent to the invalid frames or frames with uncorrectable and non-concealable errors to eliminate any "clicking" noise as described above.

The jitter tracking circuit 545 compares a block transmission timing signal with sampling timing of the receiver 505 to identify any misalignment between the block transmission timing signal and the sampling timing of the receiver 505 that indicates the above-described overrun or underrun of the digitized samples with a frame. The block transmission timing indicates a boundary between groups of adjacent frames of the digitized samples of the analog signal. The synchronization circuit 540 provides any adjustment of the sampling timing within the receiver 505 if necessary. The synchronization circuit 505 further retrieves a frame of the digitized samples and interpolates or decimates any underrun or overrun of digitized samples with the frame to provide the correct number of digitized samples of the analog signal within the frame.

Each frame of the digitized samples of the analog signal is then transferred from the receive data buffer 520 through the receive data buffer controller 515 to the data out interface 550. In the preferred embodiment, the data out interface is the I$^2$S interface that is known in the art for digital audio transmission. The data out interface 550 transfers the digitized samples of the analog signals to the digital-to-analog converters 370 and 375. The digital-to-analog converters 370 and 375 reproduce the analog signal out 380 for the left channel L and the analog signal out 385 for the right channel R. The data out interface also provides the frame of digitized samples in a digital format 390 for further processing by external circuitry.

One implementation of the preferred embodiment of the receiving system 300 is as a portable remote system for headphones to reproduce audio signals. In this application, the receiving system must be disabled when not in use. The power management circuit 565 will sense when no frames of digitized samples of the analog signal are received for a relatively long period. The power management circuit 565 then removes the power supply voltage source from the receiving system. When this happens, the soft muting circuit 535 is engaged to prevent noise during the disabling of the power supply voltage source.

The receiving clocking circuit 560 provides the oversampling timing signal to the receiver 505 to recover the modulated carrier signal and to lock the receiving system 300 to ensure the recovery of the modulated carrier signal. As described prior, the receiving clock circuit 560 is nominally identical to the clock of the transmitting system 440 of FIG. 4. Any difference in the receiving clock circuit 560 and the transmitting clock circuit 440 are the tolerance and phase differences of the two circuits and is tracked and corrected in the jitter tracking circuit 545 and the synchronization circuit 540.

The command and control byte 830 and 840 of FIG. 8 contains command and control data that is accessible in the receive buffer 520 of FIG. 5. The command and control circuit 555 has an external connection (not shown) to an interface to external circuitry. The command and control circuit accesses the command and control circuit bytes in the receive buffer, then decodes the command and control byte and transfers appropriate command and control signals to the external circuitry. In the preferred embodiment the external connection is a serial interface to provide volume control to a remote speaker or for text transmission to a panel display.

Figure 12:
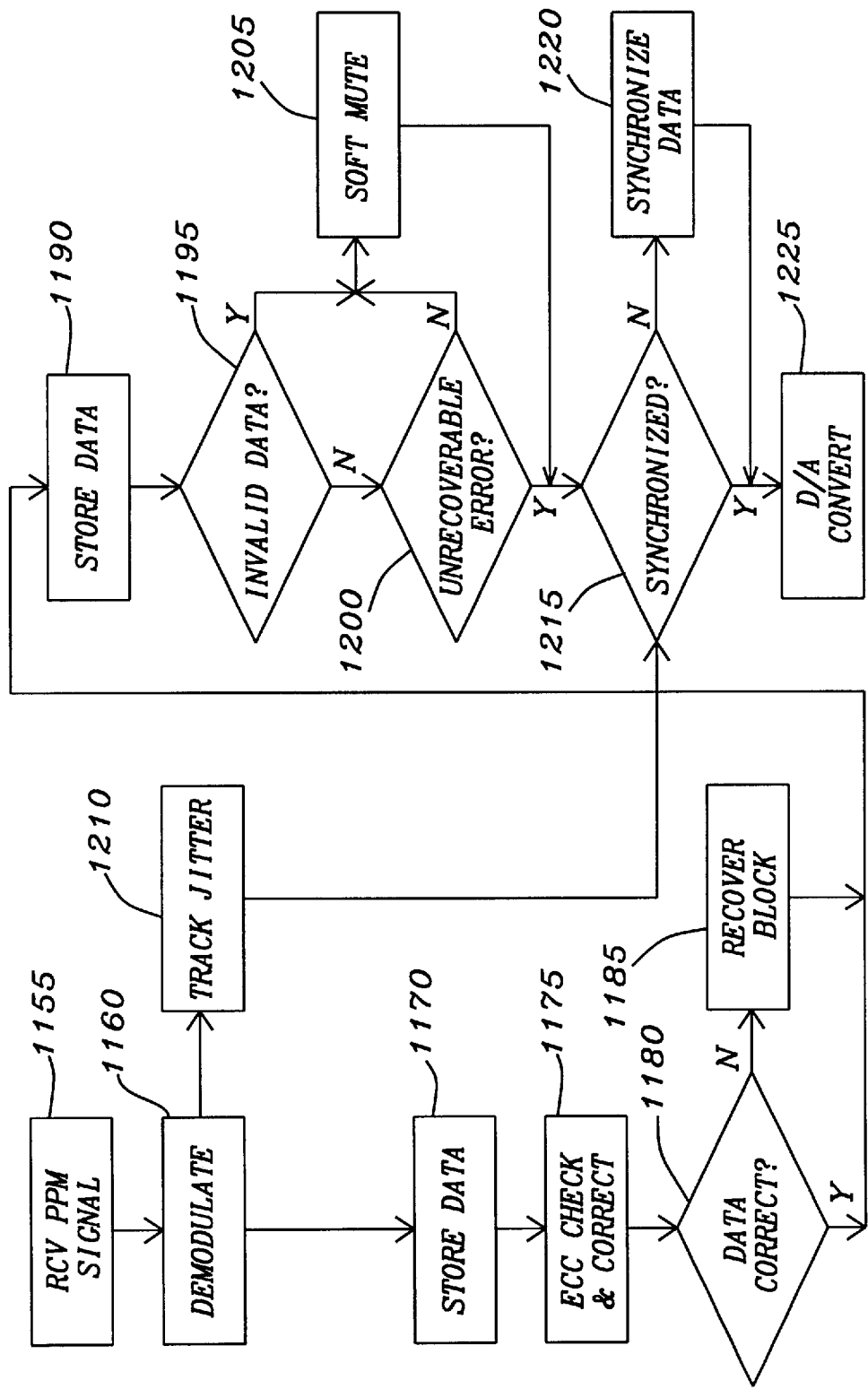
FIG. 12 is a flow diagram of the method of receiving, recovering, concealing, and reproducing digitized samples of analog signals of this invention.

As is known by one skilled in the art, many of the functions of the transmitting system 395 of FIG. 4 and the receiving system 300 of FIG. 5 could be incorporated as methods executed within a computer system such as a microprocessor, a digital signal processor, or a microcontroller. Refer now to FIGS. 11 and 12 for a review of the method for transmitting digitized samples of an analog signal, receiving the digitized samples of the analog signal and reproducing the analog signal.

The method of transmitting begins receiving 1100 of the digitized samples of the analog signal. The digitized samples have the format as described for the international standards that define the S/PDIF format. Those digitized samples that are collected at a sampling rate other than the fixed rate of this invention must be converted 1115 to digitized samples collected at the fixed rate. In the preferred embodiment the fixed rate is 48 kHz and in the alternate embodiment the fixed rate is 44.1 kHz.

Alternative to receiving 1100 the digitized samples from a digital source such as a CD, MP3, DAT, DVD, etc., is receiving 1110 the analog signal and performing an analog-to-digital conversion 1120 at the fixed rate to generate the digitized samples of the analog signal. The analog signal may have multiple channels. For instance, the analog signal of stereo audio has a left channel and a right channel. Each channel is separately converted 1120 from analog-to-digital digital to form a left channel set of digitized samples and a right channel set of digitized samples.

The digitized samples of the analog signal are stored 1125 in a buffer and organized into the interleaved structure of FIG. 8. As described in FIG. 8, the least significant bytes of the even designated digitized samples are placed in a first segment of the buffer. The least significant bytes of the left channel set of digitized samples are alternated with the right channel set of digitized samples within the first segment. The most significant bytes of the alternated left channel and right channel set of even designated digitized samples are placed in the second segment of the buffer. The least significant bytes of the alternated left channel and right channel set of the odd designated digitized samples are placed in a third segment of the buffer. The most significant bytes of the alternated left channel and right channel of the odd designated digitized samples are placed in a fourth segment of the buffer. This structure interleaves the digitized samples such that adjacent samples are separated to reduce the probability of an error condition totally disrupting groups of digitized samples and the errors that occur can be corrected or concealed. To allow parallel processing of the digitized samples, the buffer has multiple segments to retain multiple frames of the interleaved groups of digitized samples.

An error correction code is generated 1130 for the group of digitized samples and appended to the groups of digitized samples within the buffer. In the preferred embodiment of this invention, the ECC code is generated 1130 for the second segment of the buffer or the most significant bytes of the even designated samples and for the fourth segment of the buffer or the most significant bytes of the odd designated samples.

The ECC generation 1130 employs a Reed-Solomon method on a codeword of 255 bytes have a Galois Field GF ($2^8$) where 238 of the most significant bytes of the digitized samples and one command and control byte are the data to be protected. The ECC code is 16 bytes and provides correction up to 8 bytes within the code word.

Each frame of the groups of interleaved digitized samples are formatted 1135 to form the transmit frame. The transmit frame is structured as shown in FIG. 6. As described in FIG. 6, a first timing preamble and a first start flag signal are appended before the even designated digitized samples to form a first subframe. A second timing preamble and a second start flag signal are appended before the odd designated digitized samples to form a second subframe and to complete a frame.

The transmit frame then pulse position modulates 1145 a carrier signal. The pulse position modulation 1145 converts the raw non-return to zero encoding of the digitized samples to the pulse position coding as shown in FIG. 7. In the preferred embodiment, the carrier signal has a frequency of at least 2 MHz. The positioning of the pulse is determined by the value of pairs of bits of the transmit frame.

The modulated carrier signal then activates a driver circuit to transmit 1150 the modulated carrier signal on a communication medium. As described above, the communication medium may be wired or wireless, transmitting either light or RF energy. The wired communication medium may be fiber optic cable, coaxial cable, or common two wire twisted pair cable.

The burst transmitter 1150 is transmitting the entire modulated carrier signal for a relatively short period when compared with the period of the analog signal included in the frame of the digitized samples. In the preferred embodiment, 238 samples of the left channel and the right channel are included in each frame. Since the samples of the left channel and the samples of the right channel are created simultaneously, 119 samples of the analog signal or 2.479 milliseconds of the analog signal are transmitted. With the frequency of the carrier signal being 2 MHz, each frame is transmitted in 1.972 milliseconds. The transmission is then idle 20.5% of the time. This minimizes any effect of burst noise in the transmission medium and improves the probability that the transmission is received 1155. If the frequency of the carrier signal increases or the period of the burst of the digitized signals decreases, the idle time will increase accordingly.

The modulated carrier signal is received 1155 by sensing and amplifying the modulated carrier signal. In the preferred embodiment, the modulated carrier signal is transmitted 1150 as infrared light created by activating and deactivating a light emitting diode to radiate the infrared light to the atmosphere. A light sensitive diode receives 1155 the infrared light, converts the infrared light to electrical impulses that are sensed and amplified. The received modulated carrier signal is recovered by oversampling the received modulated carrier signal to determine a position to lock onto to capture the modulated carrier signal. The timing preamble is tested to find the correct lock position to correctly retrieve the timing preamble, the start flag signal sensed, and the frame of the groups of interleaved digitized samples are recovered.

The recovered modulated groups of the interleaved digitized samples are demodulated 1160 to recover raw non-return to zero encoding of the digitized samples.

The frames of the digitized samples are stored 1170 in a buffer as described in FIG. 8. The most significant bytes of the even designated digitized samples and the most significant bytes of the odd designated digitized samples and their respective ECC codewords have an ECC check and correction 1175 performed to find and repair any errors to the digitized samples within a frame. The ECC check and correction 1175 is the known Reed-Solomon method as described above.

Any of the groups of most significant bytes of the even designated or odd designated digitized samples that cannot be corrected are identified to be recovered 1185 by concealing the error. The groups are tested 1180 for having errors. If there are errors, the digitized samples with errors and the adjacent digitized samples that are error-free are examined and an estimate of the digitized sample in error is generated by linearly interpolating between the adjacent digitized samples that are error-free.

The corrected or recovered digitized samples are then stored 1190 in the buffer in the location containing errors. Any unrecoverable errors are identified for soft muting.

The frames of the digitized samples are checked 1195 for invalid data, unrecoverable errors 1200, and for synchronization 1215 and conveyed to a digital-to-analog converter to reproduce 1225 the analog signal. If the frames of the digitized samples are invalid 1195 or unrecoverable 1200, the invalid or unrecoverable frames and adjacent correct frames of the digitized data are soft muted 1205. Soft muting 1205 applies a Hanning window to the invalid or unrecoverable frames of digitized samples and to the adjacent correct frames to weight the adjacent correct frames to slowly bring to null the reproduced analog signal. This eliminates an annoying effect that occurs if only the invalid or unrecoverable frame is muted in an audio application.

During the recovery 1155 and demodulation 1160 of the modulated carrier signal, the difference between the frequency of the evaluation point of the oversampling clock and the carrier signal is tracked to determine synchronization. The jitter tracking 1210 is tested 1215 to ensure there is no overrun or underrun of the number of samples. If there is an overrun or underrun, the frames of digital data are decimated or interpolated to synchronize 1220 the digitized samples before they are converted 1225 to reproduce the analog signals. The decimated or interpolated digitized samples insure that there are the correct number of digitized samples in each frame.

While this invention has been particularly shown and described with reference to the preferred embodiments thereof, it will be understood by those skilled in the art that various changes in form and details may be made without departing from the spirit and scope of the invention.

The invention claimed is:

1. A digital communication system for transmitting and receiving digitized data samples of analog signals comprising:

a transmission subsystem connected to an external signal source for receiving said analog signal from the external signal source, sampling said analog signals to create fixed rate digitized data samples of said analog signals, generating error correction codes for said fixed rate digitized data samples to allow correction of errors in said fixed digitized samples that occur during transmitting of said fixed rate digitized data samples, formatting said fixed rate digitized data samples into groups of interleaved digitized samples, appending the error correction codes, a preamble timing signal and a start signal to said group of interleaved digitized samples to form a transmit frame, modulating a carrier signal with said transmit frame and transmitting as a short burst said modulated carrier signal;

a communication medium connected to the transmission subsystem to transfer said modulated carrier signal; and a receiving subsystem connected to the communication medium for receiving said modulated carrier signal, demodulating said modulated carrier signal to recover said transmit frame, extracting the group of interleaved digitized samples and the error correction codes from said transmit frame, checking and correcting said group of interleaved digitized samples, identifying any of said group of interleaved digitized samples that are uncorrectable, if any of said group of interleaved digitized samples are uncorrectable, interpolating from adjacent interleaved digitized samples an estimated sample value of those uncorrectable digitized samples to conceal any effect of said uncorrectable digitized samples, applying a smoothing function to said digitized samples to bring those of the digitized samples with the non-correctable and non-concealable errors to a null value, jitter tracking to determine overrun and underrun of the contents of the group of interleaved multiple digitized samples to compare block transmission signal with a clock signal of said receiver subsystem, generating or eliminating digitized samples of the analog signals if the jitter tracking indicates overrun or underrun of the contents of the group of interleaved multiple digitized samples analog signals, and transferring the digitized samples to a digital-to-analog converter for restoration of said analog signal.

2. The communication system of claim 1 wherein said transmission subsystem comprises:

a sampled data receiver to receive said digitized samples of the analog signals from the external source of the digitized samples analog signals;

a data buffer to retain a plurality of the digitized samples analog signals, a data buffer controller connected to the data buffer to control the placement and removal of the plurality of digitized samples of the analog signals within the data buffer;

an error correction code generator connected to the data buffer controller to receive multiple digitized samples of the analog signals through said data buffer controller from said data buffer, to generate an error correction word to be appended to said multiple digitized samples analog signals, and to return the multiple digitized samples of the analog signals with the appended error correction word through the data buffer controller to the data buffer;

a frame formatter connected to the data buffer controller to receive an interleaved group of the multiple digitized samples of the analog signals and append a preamble timing signal and a start signal before said interleaved group of the multiple digitized samples of the analog signals to form a transmit frame;

a pulse position modulator connected to the frame formatter to receive the transmit frame and modulate according to a bit value of the transmit frame a pulse position within a carrier signal with the transmit frame; and a burst transmitter connected between the pulse position modulator and the communication medium to convey a modulated carrier signal to said communication medium, whereby said modulated carrier signal is transmitted as the short burst within a short time period to minimize probability of interference on said communication medium.

3. The communication system of claim 2 wherein the transmission subsystem receives said digitized data samples of the analog signals that are sampled at a plurality of sampling rates and converts said digitized data samples sampled at the plurality of sampling rates to fixed rate digitized data samples, and wherein said transmission subsystem comprising a variable sampling rate converter connected to said sampled data receiver to convert the digitized samples of the analog signals at the one rate of the plurality of sampling rates to digitized samples of the analog signals sampled at a fixed rate.

4. The communication system of claim 1 wherein the receiving subsystem comprises:

a receiver connected to the communication medium to recover said modulated carrier signal and extract a modulated transmit frame;

a demodulator connected to said receiver to demodulate the modulated transmit frame and recover the transmit frame and extract the groups of interleaved multiple digitized samples of the analog signals with the appended error correction code;

a received data buffer to retain the group of interleaved multiple digitized samples of the analog signals with the appended error correction code;

a received data buffer controller connected to the demodulator and the received data buffer to control transfer of the group of interleaved multiple digitized samples of the analog signals with the appended error correction code from the demodulator to the received data buffer;

an error check and correction circuit connected to the received data buffer controller to receive one group of the multiple digitized samples of the analog signals with the appended error correction code, to check and correct errors in said one of the multiple digitized samples analog signals, to replace the corrected one group of the multiple digitized samples of the analog signals to the received data buffer, and to identify any non-correctable group of the multiple digitized samples analog signals;

a block recovery circuit connected to the received data buffer controller to interpolate the non-correctable group of the multiple digitized samples of the analog signals to conceal an effect of said non-correctable group of the multiple digitized samples analog signals;

a soft muting circuit connected to the received data buffer controller to access those multiple digitized samples of the analog signals with non-recoverable and non-concealable errors and those of the multiple digitized samples of the analog signals that are correct and adjacent to the multiple digitized samples of the analog signals with the non-correctable and non-concealable errors, to apply the smoothing function to said multiple digitized samples of the analog signals to bring those of the multiple digitized samples of the analog signals with the non-correctable and non-concealable error to the null value;

a jitter tracking circuit to compare the block transmission signal with the clock signal of said receiver subsystem to determine the overrun and underrun of the contents of the group of interleaved multiple digitized samples of the analog signals with the appended error correction code, whereby said block transmission timing signal indicates a boundary of said group of the multiple digitized samples analog signals;

a synchronization circuit connected to the jitter tracking circuit and the received data buffer controller to generate or eliminate digitized samples of the analog signals if the jitter tracking circuit indicates overrun or underrun of the contents of the group of interleaved multiple digitized samples analog signals; and an interface circuit connected to the received data buffer controller to translate the digitized samples of the analog signals to a format acceptable by subsequent circuitry.

5. The communication system of claim 1 wherein the analog signals are digitized and formatted to form the digitized samples having a non-return to zero encoding.

6. The communication system of claim 1 wherein the communication medium is selected from the communication media consisting of wired media and wireless media.

7. The communication system of claim 1 wherein the modulated carrier signal is transmitted as light.

8. The communication system of claim 1 wherein the modulated carrier signal is transmitted as a radio frequency signal.

9. The communication system of claim 1 wherein the wired media comprise coaxial cable, fiber optic cable, and two wire audio cable.

10. The communication system of claim 2 wherein the transmission subsystem further converts the analog signals to digitized samples.

11. The communication system of claim 10 wherein the transmission subsystem is further comprising at least one analog-to-digital converter connected between the external source and the data buffer controller to receive the analog signals and to generate the digitized samples of the analog signals.

12. The communication system of claim 1 wherein the digitized samples are sampled at one of a plurality of sampling rates.

13. The communication system of claim 12 wherein the plurality of sampling rates comprise 32 kHz, 44.1 kHz, and 48 kHz.

14. The communication system of claim 3 wherein the fixed sampling rate is selected from a group of sampling rates consisting of 48 kHz and 44.1 kHz.

15. The communication system of claim 1 wherein the error correction code is a forward error correction code using a Reed Solomon encoding.

16. The communication system of claim 15 wherein the error correction code word has a data block size of 238 bytes and one control byte and 16 parity bytes.

17. The communication system of claim 1 wherein the interleaved group of the multiple digitized samples comprises a plurality of least significant bytes of the even designated digitized samples of the group of multiple digitized samples, a plurality of most significant of the even designated digitized samples, a first command byte, a first plurality of error correction parity bytes, a plurality of least significant bytes of the odd designated digitized samples, a plurality of most significant bytes of the odd designated digitized samples, a second command byte, and a second plurality of error correction parity bytes.

18. The communication system of claim 1 wherein said carrier signal is modulated with a pulse positioned modulation whereby said pulse positioned modulation is positioning of a pulse of said carrier signal within a period of said carrier signal according to a binary value of a plurality of bits within said transmit frame.

19. The communication system of claim 18 wherein said plurality of bits is a pair of bits within said transmit frame.

20. The communication system of claim 19 wherein the digitized samples are a non-return to zero encoding.

21. The communication system of claim 2 wherein said burst transmitter comprises an infrared light emitting diode and a diode switching circuit connected between the pulse position modulator and the infrared light emitting diode to activate and deactivate said infrared light emitting diode with the modulated carrier signal.

22. The communication system of claim 4 wherein the receiver comprises a light sensitive diode that receives light radiated from the infrared light emitting diode.

23. The communication system of claim 4 wherein the demodulator demodulates the modulated carrier signal by oversampling said modulated carrier signal to determine an evaluation point of said modulated carrier signal to recover said transmit frame.

24. The communication system of claim 4 wherein the demodulator circuit detects the preamble timing signal and the start signal to indicate a location of the interleaved group of the multiple digitized samples of the analog signals within the transmit frame.

25. The communication system of claim 4 wherein the block recovery circuit conceals the effect of said non-correctable group of the multiple digitized samples of the analog signals by interpolating adjacent correct digitized samples of the analog signals to estimate a correct magnitude for said non-correctable group of the multiple digitized samples analog signals.

26. The communication system of claim 4 wherein the smoothing function applies a Hanning window to those of the multiple digitized samples of the analog signals with non-recoverable and non-concealable errors and those of the multiple digitized samples of the analog signals that are correct and adjacent to those of the multiple digitized samples of the analog signals with non-recoverable and non-concealable errors to smoothly decrease those of the multiple digitized samples of the analog signals that are correct and adjacent to those of the multiple digitized samples of the analog signals with non-recoverable and non-concealable errors to allow a gentle muting.

27. The communication system of claim 4 wherein the soft muting circuit, upon bringing multiple digitized samples of the analog signals with non-recoverable and non-concealable errors to a null value, further sets subsequent multiple digitized samples of the analog signals to a null value preventing repetitive interference on said communication medium.

28. A method for transmitting, receiving, and recovering digitized samples of analog signals comprising the steps of:
acquiring said analog signals;
sampling said analog signals at a fixed sampling rate to generate said digitized signals;
interleaving the digitized samples to separate adjacent digitized samples decreasing a probability of loss of fidelity of said analog signal due to unrecoverable errors;
generating an error correction code to provide a group of interleaved digitized samples with redundancy to recover interleaved digitized samples having errors created during transmitting and receiving;
forming a transmit frame with a plurality of groups of interleaved digitized samples, error correction codes, a preamble timing signal, and a start signal;
modulating a carrier signal with said transmit frame;
transmitting as a burst the modulated carrier signal on a communication medium, whereby said burst is a short period of time relative to a time of sampling represented by said digitized samples within the transmit frame;
receiving the modulated carrier signal;
demodulating said modulated carrier signal to recover said transmit frame;
extracting the plurality of groups of interleaved digitized samples and the error correction codes from the recovered transmit frame;
checking and correcting the groups of interleaved digitized samples;
identifying any of said group of interleaved digitized samples that are uncorrectable;
if any of the digitized samples have uncorrectable errors, concealing any effect of said uncorrectable errors by interpolating from adjacent correct digitized samples an estimate of a sample value of said digitized samples with uncorrectable errors;
applying a smoothing function to said digitized samples to bring those of the digitized samples with the non-correctable and non-concealable errors to a null value;
jitter tracking to determine overrun and underrun of the contents of the group of interleaved multiple digitized samples to compare a block transmission signal with a clock signal of said receiver subsystem;
generating or eliminating digitized samples of the analog signals if the utter tracking indicates overrun or underrun of the contents of the group of interleaved multiple digitized samples analog signals; and
transferring the digitized samples to a digital-to-analog converter to restore the analog signal.

29. The method of claim 28 further comprising the steps of:
digitizing said analog signals, and
formatting the digitized analog signal as a non-return to zero encoding of the digitized samples of the analog signal.

30. The method of claim 28 wherein the communication medium is selected from the communication media consisting of wired media and wireless media.

31. The method of claim 28 wherein the modulated carrier signal is transmitted as light.

32. The method of claim 28 wherein the modulated carrier signal is transmitted as a radio frequency signal.

33. The system of claim 30 wherein the wire media comprise coaxial cable, fiber optic cable, and two wire audio cable.

34. The method of claim 28 further comprising the steps of:
receiving digitized data samples of the analog signals, whereby said digitized samples of the analog signal have a sampling rate selected from a plurality of sampling rates; and
converting said digitized data samples sampled at one of the plurality of sampling rates to the fixed rate digitized data samples.

35. The method of claim 34 wherein the plurality of sampled rates of 32 kHz, 44.1 kHz, and 48 kHz.

36. The method of claim 28 wherein the fixed rate is 48 kHz.

37. The method of claim 28 wherein the fixed rate is 44.1 kHz.

38. The method of claim 28 wherein the error correction code is generated using a Reed-Solomon error correction method.

39. The method of claim 28 wherein the error correction code has a data block size of 238 bytes and 1 control byte and 16 parity bytes.

40. The method of claim 28 wherein the group of interleaved digitized samples are comprised of a plurality of least significant bytes of the even designated digitized samples of the group of multiple digitized samples, a plurality of most significant of the even designated digitized samples, a first command byte, a first plurality of error correction parity bytes, a plurality of least significant bytes of the odd designated digitized samples, a plurality of most significant bytes of the odd designated digitized samples, a second command byte, and a second plurality of error correction panty bytes.

41. The method of claim 28 wherein modulating said carrier signal comprises the step of positioning a pulse positioned modulation whereby said pulse positioned modulation is positioning of a pulse of said carrier signal within a period of said carrier signal according to a binary value of a plurality of bits within said transmit frame.

42. The method of claim 41 wherein said plurality of bits is a pair of bits within said transmit frame.

43. The method of claim 28 where demodulating the carrier signal comprises the step of oversampling said modulated carrier signal to determine an evaluation point of said modulated carrier signal to recover said transmit frame.

44. The method of claim 28 wherein extracting the plurality of groups of interleaved digitized samples and error correction codes comprises the step of detecting the preamble timing signal and the start signal to indicate a location of the interleaved group of the multiple digitized samples of the analog signals within the transmit frame.

45. The method of claim 28 wherein the smoothing function applies a Hanning window to those of the multiple digitized samples of the analog signals with non-recoverable and non-concealable errors and those of the multiple digitized samples of the analog signals that are correct and adjacent to those of the multiple digitized samples of the analog signals with non-recoverable and non-concealable errors to smoothly decrease those of the multiple digitized samples of the analog signals that are correct and adjacent to those of the multiple digitized samples of the analog signals with non-recoverable and non-concealable errors to allow a gentle muting.

46. The method of claim 28 further comprising the step of upon soft muting multiple digitized samples of the analog signals with non-recoverable and non-concealable errors to a null value, further setting multiple digitized samples of the analog signals that are subsequent to the multiple digitized samples of the analog signals with non-recoverable and non-concealable errors to a null value preventing repetitive interference on said communication medium.

* * * * *

UNITED STATES PATENT AND TRADEMARK OFFICE
CERTIFICATE OF CORRECTION

PATENT NO. : 6,671,325 B2 Page 1 of 1
APPLICATION NO. : 10/283470
DATED : December 30, 2003
INVENTOR(S) : Kah Yong Lee et al.

It is certified that error appears in the above-identified patent and that said Letters Patent is hereby corrected as shown below:

Title page Assignee, (73), delete Assignee, "Free Systems Pte. Ltd., Singapore (SG)" and replace with -- FreeSystems Pte. Ltd., Singapore (SG) --.

Signed and Sealed this

Thirteenth Day of October, 2009

David J. Kappos
*Director of the United States Patent and Trademark Office*